US012706785B2

(12) United States Patent
Lu et al.

(10) Patent No.: US 12,706,785 B2
(45) Date of Patent: Aug. 11, 2026

(54) LOCATION DETECTION METHOD AND RELATED APPARATUS

(71) Applicant: Huawei Technologies Co., Ltd., Shenzhen (CN)

(72) Inventors: Yuchun Lu, Beijing (CN); Weiyu Wang, Beijing (CN); Huanlu Li, Shenzhen (CN); Haiyang Zhang, Beijing (CN); Liang Li, Beijing (CN); Qinyu Zhou, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 18/898,884

(22) Filed: Sep. 27, 2024

(65) Prior Publication Data

US 2025/0023763 A1 Jan. 16, 2025

Related U.S. Application Data

(63) Continuation of application No. PCT/CN2023/081358, filed on Mar. 14, 2023.

(30) Foreign Application Priority Data

Mar. 31, 2022 (CN) ........................ 202210346736.9

(51) Int. Cl.
*H04L 25/03* (2006.01)

(52) U.S. Cl.
CPC .............................. *H04L 25/03267* (2013.01)

(58) Field of Classification Search
CPC . H04L 1/0078; H04L 1/203; H04L 25/03006; H04L 25/03057; H04L 25/03146; H04L 25/03267; H04L 25/03949; H04L 2025/03796; H04L 2025/03808
USPC ............... 375/224, 232, 233, 346, 348, 350; 455/226.1, 456.1; 708/322, 323
See application file for complete search history.

(56) References Cited

U.S. PATENT DOCUMENTS

| | | | | |
|---|---|---|---|---|
| 12,413,457 | B1 * | 9/2025 | Yang | H04L 25/03267 |
| 2013/0064281 | A1 * | 3/2013 | Raphaeli | H04L 25/03057 375/233 |
| 2020/0295871 | A1 | 9/2020 | Lu | |
| 2021/0044462 | A1 * | 2/2021 | Lu | H04L 25/061 |
| 2023/0308322 | A1 * | 9/2023 | Weng | H04L 25/066 |

FOREIGN PATENT DOCUMENTS

| | | | | |
|---|---|---|---|---|
| CN | 109873777 A | | 6/2019 | |
| CN | 113055020 A | * | 6/2021 | H03M 13/01 |
| CN | 114448559 A | * | 5/2022 | H04L 1/0045 |
| WO | WO-2019105244 A1 | * | 6/2019 | H04L 25/03324 |

* cited by examiner

*Primary Examiner* — Young T. Tse
(74) *Attorney, Agent, or Firm* — Conley Rose, P.C.

(57) ABSTRACT

A detection method includes: obtaining a decision feedback equalizer coefficient, where the decision feedback equalizer coefficient includes a tap coefficient; obtaining a decision signal sequence of a decision feedback equalizer; determining a first location of a decision signal of a start of burst error in the decision signal sequence when the tap coefficient is less than or equal to a first preset threshold; and determining a second location of a decision signal of an end of burst error in the decision signal sequence based on the first location.

20 Claims, 12 Drawing Sheets

LOCATION DETECTION METHOD AND RELATED APPARATUS

CROSS-REFERENCE TO RELATED APPLICATIONS

This is a continuation of Int'l Patent App. No. PCT/CN2023/081358, filed on Mar. 14, 2023, which claims priority to Chinese Patent App. No. 202210346736.9, filed on Mar. 31, 2022, both of which are incorporated by reference.

FIELD

This disclosure relates to the field of communication technologies, and in particular, to a location detection method and a related apparatus.

BACKGROUND

With rapid development of related industries such as cloud computing, big data, the internet of things, and artificial intelligence, a data amount is increasing explosively. A high-speed link technology is a basic technology for a chip and an interface. A constant increase of a link transmission rate leads to severer inter-symbol interference (ISI) of a channel, an increase of an insertion loss, and an increase of a bit error rate. For an optical-electrical interconnection link, dispersion of an optical fiber and bandwidth limitations of optical-to-electrical conversion components such as a driver, a modulator, a photodetector (e.g., a PIN diode or an avalanche photodiode (APD)), and a trans-impedance amplifier (TIA) gradually emerge. Therefore, a stronger equalization technology is required to compensate for inter-symbol interference caused by insufficient bandwidths of the components.

An existing equalization technology mainly includes direct detection technologies such as a continuous time linear equalizer (CTLE), a fee forward equalizer (FFE), and a decision feedback equalizer (DFE) and sequence likelihood decision technologies such as maximum likelihood sequence estimation (MLSE) and reduced state sequence estimation (RSSE). The analog equalization method CTLE can amplify noise and has only limited equalization configurations. Therefore, the CTLE needs to be used with the FFE and DFE. When the FFE is deployed at a receive end, the noise can also be amplified. The DFE can accurately equalize post ISI. However, once a bit error occurs, bit error transmission occurs. This increases a total bit error rate. The sequence likelihood decision technologies such as the MLSE and the RSSE have better performance, but are more complex than the FFE and the DFE. In addition, there is an addition-comparison-selection (ACS) feedback loop, which needs to be expanded in a high-speed parallel implementation condition. This consumes a lot of chip area and power.

In addition, when ISI of a link deteriorates, a bit error rate of the link also increases. As a result, an existing forward error correction (FEC) algorithm has a performance risk, and an error correction capability of the FEC needs to be improved. One method for improving the error correction capability of the FEC improves the error correction capability by adding a parity bit and increasing overheads, but leads to problems such as a decrease in link utilization, a delay increase, and a decoding complexity increase.

SUMMARY

Embodiments provide a location detection method and an apparatus, to determine a location of a decision signal corresponding to a burst error in a decision signal sequence.

To achieve the foregoing objectives, the following technical solutions are used in embodiments.

According to a first aspect, an embodiment provides a location detection method. The method may be performed by a location detection apparatus, or may be performed by a chip used in a location detection apparatus. The following provides descriptions by using an example in which the method is performed by the location detection apparatus. The method includes: The location detection apparatus obtains a decision feedback equalizer coefficient, where the decision feedback equalizer coefficient includes a tap coefficient; obtains a decision signal sequence of a decision feedback equalizer; determines a first location of a decision signal of a start of burst error in the decision signal sequence when the tap coefficient is less than or equal to a first preset threshold; and determines a second location of a decision signal of an end of burst error in the decision signal sequence based on the first location. The tap coefficient is a tap coefficient of the decision feedback equalizer. Certainly, the tap coefficient may also be referred to as a value of a of a channel.

Therefore, when the location detection apparatus determines the location of the decision signal of the start of burst (SoB) in the decision signal sequence, the location detection apparatus can further determine the location of the decision signal of the end of burst (EoB) in the decision signal sequence based on the SoB. This provides a basis for eliminating an error between the SoB and the EoB, and helps reduce a bit error rate.

In a possible design, determining a second location of a decision signal of an end of burst error in the decision signal sequence based on the first location includes: determining a first candidate location at which the decision signal of the end of burst error appears latest in the decision signal sequence, where the first candidate location is a location of at least one decision signal after the decision signal of the start of burst error; determining a first decision region based on the first candidate location and the first location, where the first decision region includes the first candidate location and a location corresponding to a decision signal between the first location and the first candidate location; and determining the second location of the decision signal of the end of burst error in the decision signal sequence based on the first decision region.

Therefore, when the location detection apparatus determines the first location and a latest location at which the decision signal of the EoB may appear in the decision signal sequence, a range within which the location detection apparatus searches for the decision signal of the EoB is reduced to some extent, and a calculation amount of the location detection apparatus is further reduced.

In a possible design, the determining the second location of the decision signal of the end of burst error in the decision signal sequence based on the first decision region includes: obtaining a difference corresponding to a decision signal in the first decision region, where the difference is a difference between a sign value of the decision signal and a corresponding equalization value; and determining, in the decision region as the second location of the decision signal of the end of burst error in the decision signal sequence, a location at which a positive or negative sign of a difference corresponding to a decision signal from the first location to the first candidate location is, for the first time, the same as a positive or negative sign of a difference corresponding to a previously adjacent decision signal.

Therefore, when the location detection apparatus determines the latest location at which the decision signal of the EoB may appear in the decision signal sequence, the location having the same positive or negative sign of the difference corresponding to the decision signal at a previously adjacent location is set as the second location of the decision signal of the end of burst error in the decision signal sequence based on a positive or negative sign of a difference corresponding to each decision signal identity in the first decision region determined based on the first location and a latest EoB (LEoB). This facilitates quick and accurate determining of the second location of the decision signal of the end of burst error in the decision signal sequence, and further improves accuracy and efficiency of error location detection.

In a possible design, the determining the second location of the decision signal of the end of burst error in the decision signal sequence based on the first decision region includes: obtaining an error pattern corresponding to a decision signal in the first decision region; determining an estimated error pattern based on a difference and the error pattern, where the difference is a difference between a sign value of the decision signal and a corresponding equalization value, and the estimated error pattern is a difference between the difference and the error pattern; and determining a location of a decision signal with a maximum absolute value of the estimated error pattern as the second location.

Therefore, when the location detection apparatus determines the latest location at which the decision signal of the EoB may appear in the decision signal sequence, a location having a maximum absolute value of the estimated decision error is determined as the second location of the decision signal of the end of burst error in the decision signal sequence based on an estimated decision error that corresponds to each decision signal identity and that is determined in the first decision region determined based on the SoB and the LEoB. This facilitates quick and accurate determining of the second location of the decision signal of the end of burst error in the decision signal sequence, and further improves accuracy and efficiency of error location detection.

In a possible design, the determining a first candidate location at which the decision signal of the end of burst error appears latest in the decision signal sequence includes: obtaining a DFE check value corresponding to a decision signal in the decision signal sequence, where the DFE check value is determined based on a sign value of the decision signal and a corresponding estimated error pattern; and determining a location at which the DFE check value corresponding to the decision signal exceeds a preset range as the first candidate location.

The preset range may be [0, 3]. If the DFE check value is −1 or 4, the DFE check value exceeds the preset range. Certainly, the DFE check value may alternatively be another value.

Therefore, when the location detection apparatus can determine DFE check values corresponding to signal locations, the location detection apparatus can determine, based on value statuses of the DFE check values corresponding to the signal locations, which signal location after the decision signal of the SoB is the latest signal location at which the decision signal of the EoB may appear in the decision signal sequence, namely, the second location in the decision signal sequence.

In a possible design, the method further includes: determining a third location of the decision signal of the end of burst error in the decision signal sequence when the tap coefficient is greater than or equal to the first preset threshold; determining a second candidate location at which the decision signal of the start of burst error starts to appear in the decision signal sequence, where the second candidate location is a location of at least one decision signal before the decision signal of the end of burst error; and determining a fourth location of the decision signal of the start of burst error in the decision signal sequence based on the second candidate location and the third location.

Therefore, when the tap coefficient is greater than or equal to the first preset threshold, the location detection apparatus first determines the third location of the decision signal of the end of burst error in the decision signal sequence, and then determines the fourth location of the decision signal of the SoB in the decision signal sequence based on the third location. Further, a region of the fourth location is limited based on the second candidate location. Therefore, a range within which the location detection apparatus searches for the decision signal of the SoB is reduced, and a calculation amount of the location detection apparatus is further reduced.

In a possible design, the determining a fourth location of the decision signal of the start of burst error in the decision signal sequence based on the second candidate location and the third location includes: determining a second decision region based on the third location and the second candidate location, where the second decision region includes the second candidate location and a location corresponding to a decision signal between the second candidate location and the third location; obtaining a difference corresponding to a decision signal in the second decision region, where the difference is a difference between a sign value of the decision signal and a corresponding equalization value; and determining a location of a decision signal corresponding to a maximum absolute value of the difference corresponding to the decision signal in the second decision region as the fourth location.

Therefore, the second decision region in which the decision signal of the start of burst error in the decision signal sequence is located is determined based on the second candidate location and the third location of the decision signal of the end of burst error in the decision signal sequence, and the location of the decision signal corresponding to the maximum absolute value of the difference is determined in the region as the fourth location.

In a possible design, the method further includes: correcting a decision signal corresponding to the first location to the second location, to reduce the bit error rate.

According to a second aspect, an embodiment provides a location detection apparatus, including a communication unit and a processing unit, where the communication unit is configured to obtain a decision feedback equalizer coefficient, where the decision feedback equalizer coefficient includes a tap coefficient; the communication unit is further configured to obtain a decision signal sequence of a decision feedback equalizer; the processing unit is configured to determine a first location of a decision signal of a start of burst error in the decision signal sequence when the tap coefficient is less than or equal to a first preset threshold; and the processing unit is further configured to determine a second location of a decision signal of an end of burst error in the decision signal sequence based on the first location.

In a possible design, the processing unit is further configured to: determine a first candidate location at which the decision signal of the end of burst error appears latest in the decision signal sequence, where the first candidate location is a location of at least one decision signal after the decision signal of the start of burst error; determine a first decision region based on the first candidate location and the first location, where the first decision region includes the first candidate location and a location corresponding to a decision signal between the first location and the first candidate location; and determine the second location of the decision signal of the end of burst error in the decision signal sequence based on the first decision region.

In a possible design, the processing unit is further configured to: obtain a difference corresponding to a decision signal in the first decision region, where the difference is a difference between a sign value of the decision signal and a corresponding equalization value; and determine, in the first decision region as the second location of the decision signal of the end of burst error in the decision signal sequence, a location at which a positive or negative sign of a difference corresponding to a decision signal from the first location to the first candidate location is, for the first time, the same as a positive or negative sign of a difference corresponding to a previously adjacent decision signal.

In a possible design, the processing unit is further configured to: obtain an error pattern corresponding to a decision signal in the first decision region; determine an estimated error pattern based on a difference and the error pattern, where the difference is a difference between a sign value of the decision signal and a corresponding equalization value, and the estimated error pattern is a difference between the difference and the error pattern; and determine a location of a decision signal with a maximum absolute value of the estimated error pattern as the second location.

In a possible design, the processing unit is further configured to: obtain a DFE check value corresponding to a decision signal in the decision signal sequence, where the DFE check value is determined based on a sign value of the decision signal and a corresponding estimated error pattern; and determine a location at which the DFE check value corresponding to the decision signal exceeds a preset range as the first candidate location.

In a possible design, the processing unit is further configured to: determine a third location of the decision signal of the end of burst error in the decision signal sequence when the tap coefficient is greater than or equal to the first preset threshold; determine a second candidate location at which the decision signal of the start of burst error starts to appear in the decision signal sequence, where the second candidate location is a location of at least one decision signal before the decision signal of the end of burst error; and determine a fourth location of the decision signal of the start of burst error in the decision signal sequence based on the second candidate location and the third location.

In a possible design, the processing unit is further configured to: determine a second decision region based on the third location and the second candidate location, where the second decision region includes the second candidate location and a location corresponding to a decision signal between the second candidate location and the third location; obtain a difference corresponding to a decision signal in the second decision region, where the difference is a difference between a sign value of the decision signal and a corresponding equalization value; and determine a location of a decision signal corresponding to a maximum absolute value of the difference corresponding to the decision signal in the second decision region as the fourth location.

In a possible design, the processing unit is further configured to correct a decision signal corresponding to the first location to the second location.

According to a third aspect, an embodiment provides a location detection apparatus, including a processor and a memory. The memory is configured to store computer instructions, and when the processor executes the instructions, the location detection apparatus is enabled to perform the method in any one of the first aspect or the possible designs of the first aspect. The location detection apparatus may be the location detection apparatus in any one of the first aspect or the possible designs of the first aspect, or a chip that implements a function of the location detection apparatus.

According to a fourth aspect, an embodiment provides a chip, including a logic circuit and an input/output interface. The input/output interface is configured to communicate with a module other than the chip. For example, the chip may be a chip that implements a function of the location detection apparatus in any one of the first aspect or the possible designs of the first aspect. The input/output interface inputs a location of a decision signal of an end of burst error in a decision signal sequence, or a first target value corresponding to a first signal location. The logic circuit is configured to run a computer program or instructions, to implement the method in any one of the first aspect or the possible designs of the first aspect.

According to a fifth aspect, an embodiment provides a computer-readable storage medium. The computer-readable storage medium stores instructions, and when the instructions are run on a computer, the computer is enabled to perform the location detection method in any one of the possible designs of the first aspect.

According to a sixth aspect, an embodiment provides a computer program product including instructions. When the computer program product runs on a computer, the computer is enabled to perform the location detection method in any one of the foregoing aspects.

According to a seventh aspect, an embodiment provides a circuit system. The circuit system includes a processing circuit. The processing circuit is configured to perform the location detection method in any one of the foregoing aspects.

For technical effect of any one of the designs of the second aspect to the seventh aspect, refer to the beneficial effect in the corresponding method provided above. Details are not described herein again.

DETAILED DESCRIPTION

Figure 1:
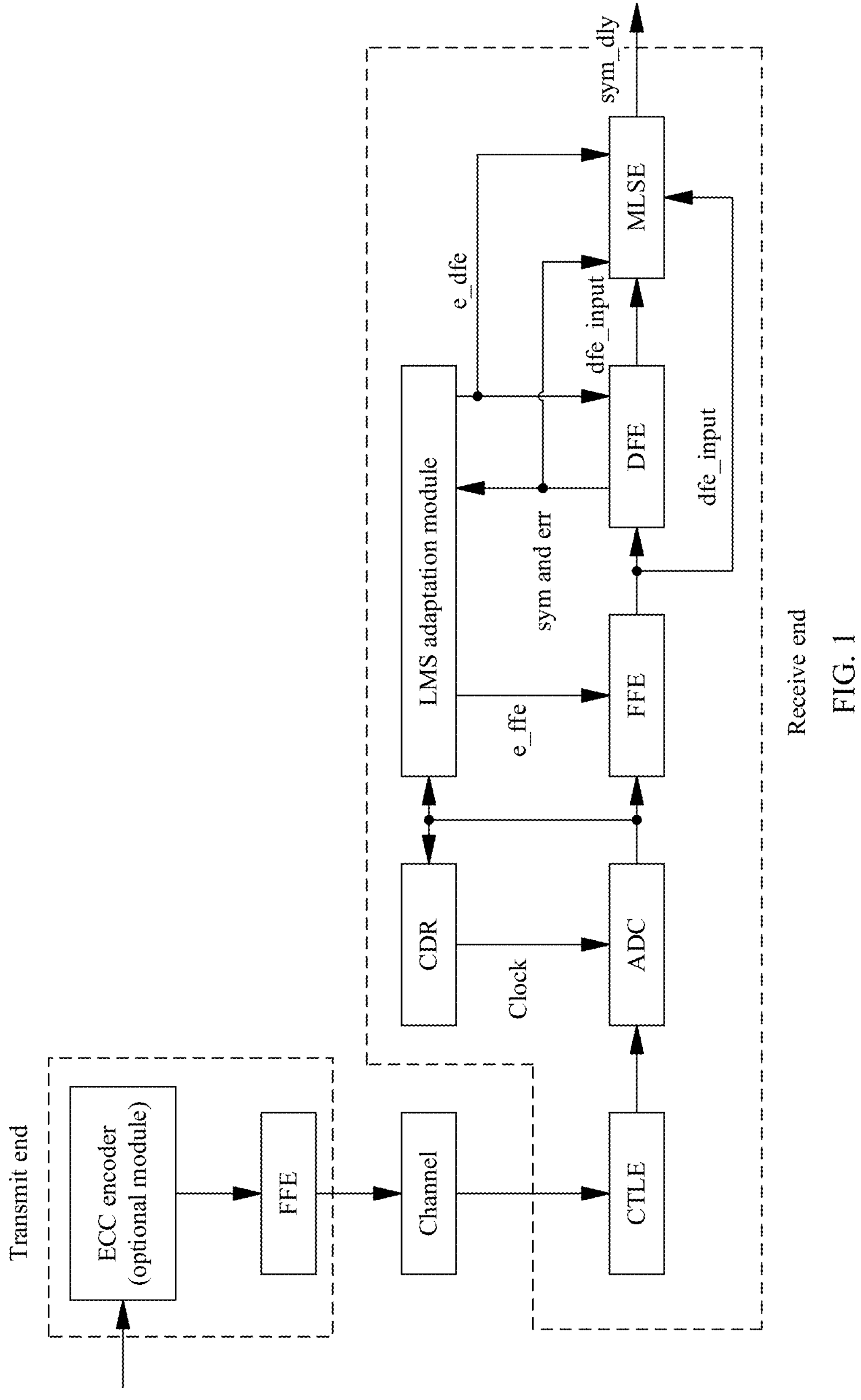
FIG. 1 is a schematic diagram of a link equalization architecture according to an embodiment.

In the specification and accompanying drawings, the terms "first", "second", and the like are intended to distinguish between different objects or distinguish between different processing of a same object, but do not indicate a particular order of the objects. In addition, the terms "including", "having", or any other variant thereof are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the system, the product, or the device. In embodiments, "a plurality of" includes two or more, and a "system" and a "network" may be replaced with each other. In embodiments, the term such as "example" or "for example" is used to represent giving an example, an illustration, or a description. Any embodiment or design scheme described as an "example" or "for example" should not be explained as being more preferred or having more advantages than another embodiment or design scheme. Exactly, use of the term "example", "for example", or the like is intended to present a related concept in a specific manner.

Technical terms in embodiments are first described.

1. Modulation and Demodulation

At a transmit end, a process of mapping a bit sequence into a signal suitable for transmission through a channel is referred to as "modulation".

At a receive end, a process of mapping a received signal into a bit sequence is referred to as "demodulation".

2. Pulse-Amplitude Modulation (PAM)

Pulse amplitude modulation is a signal modulation technique that represents transmitted data by a signal amplitude. For example, PAM-2 modulation and PAM-4 modulation are commonly used. In the PAM-2 modulation, two levels represent 1-bit information. In the PAM-4 modulation, four levels represent 2-bit information.

3. Decision Signal Identity (ID)

The decision signal identity may also be described as a "signal location of a decision signal" or a "location of a decision signal", and is used to identify a location of a decision signal in a decision signal sequence. The decision signal sequence is a sequence to which the decision signal belongs. For descriptions of the "decision signal" and the "decision signal sequence", refer to subsequent descriptions. Details are not described herein again.

For example, refer to Table 1. When one decision signal sequence includes 18 decision signals, one decision signal identity corresponds to one signal location. A location of a first decision signal in the 18 decision signals may be denoted as a decision signal identity 1, a location of a second decision signal in the 18 decision signals may be denoted as a decision signal identity 2, and locations of other decision signals in the 18 decision signals may be denoted by analogy. Details are not described herein again.

4. Pre-Encoded Data (PrecEncOut)

The pre-encoded data is data obtained by pre-encoding input data by a pre-encoder at a transmit end. A precoding technology used by the pre-encoder may be a 1/(1+D) precoding technology. The input data may be denoted as Din.

For example, a processing process of the 1/(1+D) precoding technology is as follows: When the pre-encoder receives original input data at a signal location, the pre-encoder performs pre-encoding processing on "original input data at a current signal location" based on "pre-encoded data at a previous signal location" (for example, subtracts "pre-encoded data at a previous signal location" from "original input data at a current signal location", and then performs a modulo operation), to obtain "pre-encoded data at the current signal location". For example, Table 1 is still used as an example. In a case of "the decision signal identity 1 is used as the current signal location", "original input data at a current signal location" is "1", and the "pre-encoded data at the previous signal location of the current signal location" does not exist, and is considered as "0". A difference between the two is obtained, and then a modulo operation is performed on 4, to obtain the "pre-encoded data at the current signal location", namely, "1". For another example, in a case of "the decision signal identity 2 is used as the current signal location", "original input data at a current signal location" is "3", and the "pre-encoded data at the previous signal location of the current signal location" is "1". A difference between the two is obtained, and then a modulo operation is performed on 4, to obtain the "pre-encoded data at the current signal location", namely, "2". Pre-encoded data corresponding to another decision signal identity may be deduced by analogy.

5. Channel and Theoretical Value

The channel is a channel for transmitting data between a transmit end and a receive end. For example, the data transmitted through the channel is pre-encoded data.

For example, a channel in Table 1 is a channel (1+D). Data after transmission through the channel (1+D) is described as follows: The "pre-encoded data at the previous signal location" of the decision signal identity 1 does not exist, and is considered as "0". The "pre-encoded data corresponding to the decision signal identity 1" is "1". The "pre-encoded data at a previous signal location' of the decision signal identity 1" and the "pre-encoded data corresponding to the decision signal identity 1" are added to obtain data after transmission through the channel (1+D), namely, "1". The "pre-encoded data at a previous signal location" of the decision signal identity 2 is "1". "Pre-encoded data corresponding to the decision signal identity 2" is "2". The "'pre-encoded data at a previous signal location' of the decision signal identity 2" and the "pre-encoded data corresponding to the decision signal identity 2" are added to obtain data after transmission through the channel (1+D), namely, "3". A value status obtained by transmitting pre-encoded data corresponding to another decision signal identity through the channel (1+D) may be deduced by analogy.

The theoretical value is a value obtained, when channel noise is not considered, by transmitting pre-encoded data from the transmit end to the receive end through a channel.

For example, Table 1 is used as an example. At the receive end, the theoretical value may be a value in a row of the "channel".

6. Noise

The noise is interference in a channel.

For example, Table 1 is used as an example. Noise "−0.19" corresponding to the decision signal identity 1 is interference of the pre-encoded data corresponding to the decision signal identity 1 in a channel transmission process. Noise "0.17" corresponding to the decision signal identity 2 is interference of the pre-encoded data corresponding to the decision signal identity 2 in a channel transmission process. For a noise value status of pre-encoded data corresponding to another decision signal identity in a channel transmission process, refer to Table 1 or Table 2. Details are not described herein again.

7. Input Signal (Dfe_Input) of a DFE and Input Signal Sequence

The input signal of the DFE is a signal that is input to the DFE, and may be denoted as dfe_input.

In embodiments, the DFE is a device at a receive end. The input signal of the DFE is a value that is input, when channel noise is considered, to the DFE after pre-encoded data is transmitted through a channel.

For example, Table 1 is used as an example. A value of an input signal corresponding to the decision signal identity 1 is "0.81", and is a result obtained by adding a value "1" in a row of a "channel" and a value "−0.19" in a row of "noise". A value of an input signal corresponding to the decision signal identity 2 is "3.17", and is a result obtained by adding a value "3" in a row of a "channel" and a value "0.17" in a row of "noise". For a value status of an input signal corresponding to another decision signal identity, refer to Table 1. Details are not described herein again.

The input signal sequence includes at least two input signals, and the at least two input signals are arranged in a specific order. For example, a decision feedback structure of the DFE is used as an example. An arrangement order of input signals includes an order in which the DFE receives the input signals. For two adjacent input signals in one input signal sequence, if the first input signal is a current input signal received by the DFE, the second input signal is a next input signal of the current input signal received by the DFE.

8. Equalization Value (Dfe_Output) and Equalization Value Sequence

The equalization value is a value obtained after equalization is performed on a signal. For example, in the decision feedback structure of the DFE, the equalization value is an output signal of the DFE, and is denoted as dfe_output. An adder of the DFE performs equalization on a current input signal based on a sign value (dfe_sliced data) of a decision signal of a previous input signal, to obtain dfe_output corresponding to the current input signal.

In embodiments, an equalization value corresponding to a signal location is an equalization value for determining a decision signal at the signal location. For example, the decision signal sequence including 18 decision signals in Table 1 is still used as an example. An equalization value corresponding to a signal location 1 is denoted as an equalization value 0.81, and a decision signal at the signal location 1 is a signal obtained after a decider of the DFE performs decision processing on the equalization value 0.81. For descriptions of the "decision signal", the "decision signal sequence", and the "sign value of the decision signal", refer to subsequent descriptions. Details are not described herein again.

The equalization value sequence includes at least two equalization values, and the at least two equalization values are arranged in a specific order. For example, the decision feedback structure of the DFE is still used as an example. The arrangement order of the equalization values includes an order in which the DFE determines the foregoing equalization values. For two adjacent equalization values in one equalization value sequence, if the first equalization value is an equalization value that is determined by the DFE and that corresponds to a current input signal, a second equalization value is an equalization value that is determined by the DFE and that corresponds to a next input signal of the current input signal.

9. Decision Signal, Dfe_Sliced Data, and Decision Signal Sequence

The decision signal is a signal obtained after decision processing is performed on an equalization value.

The sign value of the decision signal is a value of the decision signal, for example, a sign value of a decision signal in the decision feedback structure of the DFE. For example, the sign value of the decision signal is denoted as dfe_sliced data. The decider of the DFE performs decision processing on a current equalization value, to obtain a sign value of a decision signal corresponding to the equalization value.

The decision signal sequence includes at least two decision signals, and the at least two decision signals are arranged in a specific order. For example, the decision feedback structure of the DFE is still used as an example. An arrangement order of decision signals includes an order in which the DFE determines the decision signals. For two adjacent decision signals in one decision signal sequence, if the first decision signal is a decision signal that is determined by the DFE and that corresponds to a current equalization value, the second decision signal is a decision signal that is determined by the DFE and that corresponds to a next equalization value of the current equalization value. For an arrangement order of equalization values, refer to related descriptions of the "equalization value sequence". Details are not described herein again.

It should be noted that a sign value of a decision signal is related to modulation. PAM-4 modulation is used as an example. A sign value of the decision signal is one value of "0", "1", "2", and "3", or a sign value of the decision signal is one value of "−3", "−1", "+1", and "+3". In embodiments, in the PAM-4 modulation, an example in which a sign value of the decision signal is one value of "0", "1", "2", and "3" is used for description.

10. Difference and Difference Sequence

The difference is a difference between a sign value of a decision signal at a signal location and an equalization value corresponding to the signal location. The difference may be a positive value or a negative value. For example, the difference is denoted as err.

In embodiments, a difference corresponding to a signal location is a difference between a sign value of a decision signal at the signal location and an equalization value corresponding to the signal location. For example, the decision signal sequence including 18 decision signals in Table 1 is still used as an example. A difference corresponding to the signal location 1 is a difference between a sign value of a decision signal at the signal location 1 and an equalization value corresponding to the signal location 1.

The difference sequence includes at least two differences, and the at least two differences are arranged in a specific order. For example, the decision feedback structure of the DFE is still used as an example. An arrangement order of differences in a difference sequence is an arrangement order of decision signals.

11. Decision Noise (Dfe_Sliced_Noise)

The decision noise, also referred to as a DFE decision error value, is an estimated noise value that is determined in a process of decision processing on an equalization value and that corresponds to a signal location at which the equalization value is located. For example, the decision noise is denoted as dfe_sliced_noise.

In embodiments, decision noise corresponding to a signal location is a difference between a sign value of a decision signal at the signal location and an equalization value corresponding to the signal location. For example, the decision signal sequence including 18 decision signals in Table 1 is still used as an example. Decision noise corresponding to the signal location 1 is a difference between a sign value of a decision signal at the signal location 1 and an equalization value corresponding to the signal location 1. That is, the decision noise corresponding to the signal location 1 is a difference corresponding to the signal location 1. Alternatively, the decision noise corresponding to the signal location 1 is a product of a coefficient and a difference corresponding to the signal location 1.

12. Error Pattern (Out Error) and Estimated Error Pattern (ErrorSIGNPredicted)

The error pattern is a difference between a sign value of a decision signal in which an error occurs and a theoretical value. The error that occurs in the decision signal may be a random error, or may be a burst error. This is not limited in embodiments. For example, the error pattern may be denoted as out Error. The error pattern may be a positive value or a negative value.

The estimated error pattern is a value obtained through estimation based on the error pattern. For example, the estimated error pattern may be denoted as ErrorSIGNPredicted. For example, the error pattern and an error transmission feature of the DFE are used for estimation, to obtain the estimated error pattern. Table 1 is used as an example. An error pattern corresponding to a decision signal identity 16 is "−1", and an estimated error pattern "+1" corresponding to a decision signal identity 15 is obtained based on the error transmission feature of the DFE, to obtain an estimated error pattern "+1" corresponding to a decision signal identity 3.

In embodiments, an estimated error pattern corresponding to a signal location may also be described as an "estimated error pattern corresponding to a decision signal". The estimated error pattern corresponding to the signal location may be a positive value or a negative value.

When a value of the estimated error pattern corresponding to the signal location is a positive value, it indicates that a sign value of a decision signal corresponding to the signal location is greater than a theoretical value. In this case, the value of the estimated error pattern is subtracted from the sign value of the decision signal, to obtain the theoretical value. When a value of the estimated error pattern corresponding to the signal location is a negative value, it indicates that a sign value of a decision signal corresponding to the signal location is less than a theoretical value. In this case, the negative value of the estimated error pattern is subtracted from the sign value of the decision signal, to obtain the theoretical value.

It should be noted that, when a burst error occurs in the decision signal sequence, for at least two adjacent decision signals in which the burst error occurs, error patterns corresponding to the at least two adjacent decision signals are alternately distributed as "+1" and "−1". This distribution feature can also be described as the "error transmission feature of the DFE".

13. DFE Check Value (Dfe_Sliced_Data_Predicted)

The DFE check value is used to estimate a sign value of a decision signal in a decision signal sequence. For example, the DFE check value is denoted as dfe_sliced_data Predicted.

In embodiments, a DFE check value corresponding to a signal location is a value determined based on a sign value of a decision signal at the signal location and an estimated error pattern corresponding to the signal location. For example, the decision signal sequence including 18 decision signals in Table 1 is still used as an example. A DFE check value corresponding to the signal location 1 is a difference between a sign value of a decision signal at the signal location 1 and an estimated error pattern corresponding to the signal location 1.

It should be noted that a value range of the DFE check value is related to modulation. For example, PAM-4 modulation is used as an example. A sign value of a decision signal is one value of "0", "1", "2", and "3". A value range of the DFE check value is [0, 3]. If a DFE check value corresponding to a signal location exceeds [0, 3], it indicates that the signal location is a location of a decision signal of a start of burst error.

14. Random Error and Burst Error

The random error means that in a signal transmission process, signal locations with errors are not associated with each other at all, to be specific, a previous signal location with an error has no impact on a next signal location with an error.

The burst error means a phenomenon that in a signal transmission process, signal locations with errors are associated with each other, and the signal locations with the errors appear in a series. In other words, in the burst error, if an error occurs at a signal location, there is a high probability that an error occurs at a signal location after the signal location.

In embodiments, if the burst error occurs in the signal transmission process, a name of the "signal location with" includes at least one of the following: a signal location of an SoB error, which is a first signal location with an error in the burst error; a signal location of an earliest SoB (ESoB) error, which is a location at which a first error signal in the burst error may appear earliest; a signal location of an EoB error, which is a last signal location with an error in the burst error; or a signal location of a latest EoB (LEoB) error, which is a location at which a last error signal in the burst error may appear latest.

Further, when a signal is a decision signal, the "signal location of the SoB" may also be described as a "location of a decision signal of the SoB", namely, a location of the decision signal of the SoB in the decision signal sequence. The "signal location of the ESoB" may also be described as a "location of a decision signal of the ESoB", namely, a location at which the decision signal of the SoB may appear earliest in the decision signal sequence. The "signal location of the EoB" may also be described as a "location of a decision signal of the EoB", namely, a location of the decision signal of the EoB in the decision signal sequence.

15. Decoded Data (PrecDecOut)

The decoded data is data obtained by decoding, when data received by a receive end is pre-encoded data, the received data by using a decoding technology.

16. Error Identity (ErrorPrecDec)

The error identity is used to identify an error that occurs at a signal location.

For example, if a value of an error identity corresponding to a decision signal identity is "0", it indicates that no error occurs at this signal location. If a value of an error identity corresponding to a decision signal identity is "1", it indicates that an error occurs at this signal location, and an equalization value corresponding to the signal location is greater than a theoretical value. For example, a "decision signal identity 9" is used as an example. Because a "theoretical value" of the "decision signal identity 9" is "0" (namely, a value of the "decision signal identity 9" in a row of a "channel"), an "equalization value" of the "decision signal identity 9" is "0.51". Therefore, a value of an error identity corresponding to the "decision signal identity 9" is "1". If a value of an error identity corresponding to a decision signal identity is "−1", it indicates that an error occurs at this signal location, and an equalization value corresponding to the signal location is less than a theoretical value. For example, a "decision signal identity 17" is used as an example. Because a "theoretical value" of the "decision signal identity 17" is "6" (namely, a value of the "decision signal identity 17" in a row of a "channel"), an "equalization value" of the "decision signal identity 17" is "4.07". Therefore, a value of an error identity corresponding to the "decision signal identity 9" is "−1".

It should be noted that an example of Table 1 is as follows:

TABLE 1

| Decision signal ID | 1 | 2 | 3 | 4 | 5 | 6 | 7 | 8 | 9 |
|---|---|---|---|---|---|---|---|---|---|
| Original input data (Din) | 1 | 3 | 2 | 0 | 3 | 0 | 3 | 2 | 0 |
| PrecEncOut | 1 | 2 | 0 | 0 | 3 | 1 | 2 | 0 | 0 |
| Channel | 1 | 3 | 2 | 0 | 3 | 4 | 3 | 2 | 0 |
| Noise | −0.19 | 0.17 | −0.12 | 0.13 | −0.15 | 0.13 | 0.10 | 0.13 | 0.51 |
| Input signal of the DFE (Channel + Noise) | 0.81 | 3.17 | 1.88 | 0.13 | 2.85 | 4.13 | 3.10 | 2.13 | 0.51 |
| dfe_output | 0.81 | 2.17 | −0.12 | 0.13 | 2.85 | 1.13 | 2.10 | 0.13 | 0.51 |
| Sign value of the decision signal of the DFE (dfe_sliced_data) | 1 | 2 | 10 | 10 | 3 | 1 | 2 | 0 | 1 |
| dfe_sliced_noise | −0.19 | 0.17 | −0.12 | 0.13 | −0.15 | 0.13 | 0.10 | 0.13 | −0.49 |
| Error pattern of the DFE (DFEoutError) | 0 | 0 | 0 | 0 | 0 | 0 | 0 | 0 | 1 |
| rrorSIGNPredicted | 0 | 0 | 1 | −1 | 1 | −1 | 1 | −1 | 1 |
| dfe_sliced_data_Predicted | 1 | 2 | −1 | 1 | 2 | 2 | 1 | 1 | 0 |
| Earliest possible location of the SoB (Earliest_SoB) | 0 | 0 | −1 | 0 | 0 | 0 | 0 | 0 | 0 |
| PrecDecOut | 1 | 3 | 2 | 0 | 3 | 0 | 3 | 2 | 1 |
| ErrorPrecDec | 0 | 0 | 0 | 0 | 0 | 0 | 0 | 0 | 1 |
| Decision signal identity | 10 | 11 | 12 | 13 | 14 | 15 | 16 | 17 | 18 |
| Original input data | 1 | 3 | 3 | 2 | 0 | 0 | 0 | 2 | 3 |
| Pre-encoded data | 1 | 2 | 1 | 1 | 3 | 1 | 3 | 3 | 0 |
| Channel | 1 | 3 | 3 | 2 | 4 | 4 | 4 | 6 | 3 |
| Noise | 0.02 | −0.13 | −0.03 | 0.11 | −0.09 | −0.04 | −0.04 | 0.07 | −0.04 |
| Input signal of the DFE | 1.02 | 2.87 | 2.97 | 2.11 | 3.91 | 3.96 | 3.96 | 6.07 | 2.96 |
| Equalization value of the DFE | 0.02 | 2.87 | −0.03 | 2.11 | 1.91 | 1.96 | 1.96 | 4.07 | −0.04 |
| Sign value of the decision signal of the DFE | 0 | 3 | 0 | 2 | 2 | 2 | 2 | 3 | 0 |
| Decision noise of the DFE | 0.02 | −0.13 | −0.03 | 0.11 | −0.09 | −0.04 | −0.04 | 1.07 | −0.04 |
| Error pattern of the DFE | −1 | 1 | −1 | 1 | −1 | 1 | −1 | 0 | 0 |
| Estimated error pattern of the DFE | −1 | 1 | −1 | 1 | −1 | 1 | −1 | 0 | 0 |
| DFE check value | 1 | 2 | 1 | 1 | 3 | 1 | 3 | 3 | 0 |
| Earliest possible location of the SoB | 0 | 0 | 0 | 0 | 0 | 0 | 0 | 0 | 0 |
| Decoded data | 1 | 3 | 3 | 2 | 0 | 0 | 0 | 1 | 3 |
| Error identity | 0 | 0 | 0 | 0 | 0 | 0 | 0 | −1 | 0 |

An example of Table 2 is as follows:

TABLE 2

| Decision signal ID | 1 | 2 | 3 | 4 | 5 | 6 | 7 | 8 | 9 |
|---|---|---|---|---|---|---|---|---|---|
| Din | 1 | 3 | 2 | 0 | 3 | 0 | 3 | 2 | 0 |
| PrecEncOut | 1 | 2 | 0 | 0 | 3 | 1 | 2 | 0 | 0 |
| Channel | 1 | 2.6 | 1.2 | 0 | 3 | 2.8 | 2.6 | 1.2 | 0 |
| Noise | 0.34 | −0.04 | 0.16 | 0.09 | 0.16 | −0.14 | 0.11 | 0.11 | 0.58 |
| Channel + Noise | 1.34 | 2.56 | 1.36 | 0.09 | 3.16 | 2.66 | 2.71 | 1.31 | 0.58 |
| dfe_output | 1.34 | 1.96 | 0.16 | 0.09 | 3.16 | 0.86 | 2.11 | 0.13 | 0.58 |
| dfe_sliced_data | 1 | 2 | 0 | 0 | 3 | 1 | 2 | 0 | 1 |
| dfe_sliced_noise | 0.34 | −0.04 | 0.16 | 0.09 | 0.16 | −0.14 | 0.11 | 0.13 | −0.42 |
| DFEoutError | 0 | 0 | 0 | 0 | 0 | 0 | 0 | 0 | 1 |
| ErrorSIGNPredicted | 0 | 0 | 0 | 0 | 0 | 0 | 0 | 0 | 1 |
| dfe_sliced_data Predicted | 1 | 2 | 0 | 0 | 3 | 1 | 2 | 0 | 0 |
| Latest possible location of the EoB (Latest_SoB) | 0 | 0 | 0 | 0 | 0 | 0 | 0 | 0 | 0 |

TABLE 2-continued

| Decision signal ID | 1 | 2 | 3 | 4 | 5 | 6 | 7 | 8 | 9 |
|---|---|---|---|---|---|---|---|---|---|
| PrecDecOu | 1 | 3 | 2 | 0 | 3 | 0 | 3 | 2 | 1 |
| ErrorPrecDec | 0 | 0 | 0 | 0 | 0 | 0 | 0 | 0 | 1 |
| Decision signal identity | 10 | 11 | 12 | 13 | 14 | 15 | 16 | 17 | 18 |
| Original input data | 1 | 3 | 3 | 2 | 0 | 0 | 0 | 2 | 3 |
| Pre-encoded data | 1 | 2 | 1 | 1 | 3 | 1 | 3 | 3 | 0 |
| Channel | 1 | 2.6 | 2.2 | 1.6 | 3.6 | 2.8 | 3.6 | 4.8 | 1.8 |
| Noise | −0.18 | −0.12 | −0.03 | 0.26 | 0.01 | 0.28 | 0.35 | −0.11 | −0.21 |
| Input signal of the DFE | 0.82 | 2.48 | 2.17 | 1.86 | 3.61 | 3.08 | 3.95 | 4.69 | 1.59 |
| Equalization value of the DFE | 0.22 | 2.48 | 0.97 | 1.26 | 3.01 | 1.28 | 3.35 | 2.89 | −0.21 |
| Sign value of the decision signal of the DFE | 0 | 2 | 1 | 1 | 3 | 1 | 3 | 3 | 0 |
| Decision noise of the DFE | 0.22 | 0.48 | −0.03 | 0.26 | 0.01 | 0.28 | 0.35 | −0.11 | −0.21 |
| Error pattern of the DFE | −1 | 0 | 0 | 0 | 0 | 0 | 0 | 0 | 0 |
| Estimated error pattern of the DFE | −1 | 1 | −1 | 1 | −1 | 0 | 0 | 0 | 0 |
| DFE check value | 1 | 1 | 2 | 0 | 4 | 1 | 3 | 3 | 0 |
| Latest possible location of the EoB | 0 | 0 | 0 | 0 | 1 | 0 | 0 | 0 | 0 |
| Decoded data | 1 | 2 | 3 | 2 | 0 | 0 | 0 | 2 | 3 |
| Error identity | 0 | −1 | 0 | 0 | 0 | 0 | 0 | 0 | 0 |

Refer to Table 1 and Table 2. One decision signal identity corresponds to a location of one decision signal. Table 1 and Table 2 separately show 18 decision signal identities, namely, 18 signal locations.

At the transmit end, the original input data is data input to the pre-encoder. For values, refer to values in a row of the "original input data" in Table 1 or Table 2. The pre-encoder outputs pre-encoded data. For values, refer to values in a row of the "pre-encoded data" in Table 1 or Table 2. The pre-encoded data is transmitted through a channel. When noise is not considered, after channel transmission, a theoretical value corresponding to each decision signal identity is a value in a row of the "channel" in Table 1 or Table 2. Further, when noise is considered, noise corresponding to each decision signal identity is a value in a row of the "noise" in Table 1 or Table 2.

At the receive end, each input signal in an input signal sequence of the DFE is "a value obtained by adding noise and a theoretical value obtained after channel transmission" at a corresponding signal location. For each value, refer to a value in a row of the "input signal of the DFE" in Table 1 or Table 2. The DFE performs equalization processing on the input signal sequence by using the adder, to obtain an equalization value sequence. For each equalization value, refer to a value in a row of the "equalization value of the DFE" in Table 1 or Table 2. The DFE performs decision processing on the equalization value sequence by using the decider, to obtain a decision signal sequence. For a value of a sign value of each decision signal, refer to a value in a row of the "sign value of the decision signal of the DFE" in Table 1 or Table 2. In a decision processing process, decision noise estimated by the DFE is a value in a row of the "decision noise of the DFE" in Table 1 or Table 2.

When a burst error occurs in the decision signal sequence, a value of the estimated error pattern is a value in a row of the "estimated error pattern of the DFE" in Table 1 or Table 2. A "DFE check value" determined based on a sign value of a decision signal and an estimated error pattern is a value in a row of the "DFE check value" in Table 1 or Table 2. A location of a decision signal of an ESoB is shown by a value in a row of the "earliest possible location of the SoB" in Table 1. In values in the row of the "earliest possible location of the SoB", if a value corresponding to a decision signal identity is "0", it indicates that this signal location is not the location of the decision signal of the ESoB; or if a value corresponding to a decision signal identity is "−1", it indicates that this signal location is the location of the decision signal of the ESoB. A location of a decision signal of an LEoB is shown by a value in a row of the "latest possible location of the EoB" in Table 2. In values in the row of the "latest possible location of the EoB", if a value corresponding to a decision signal identity is "0", it indicates that this signal location is not the location of the decision signal of the LEoB; or if a value corresponding to a decision signal identity is "1", it indicates that this signal location is the location of the decision signal of the LEOB.

At the receive end, the receive end decodes received data, to obtain decoded data, as shown in data in a row of the "decoded data" in Table 1 or Table 2. The "error identity" shows a signal location at which an error occurs in the foregoing decision signal sequence.

17. Signal Equalization Technology

The signal equalization technology is a signal processing technology. A signal is easily distorted during channel transmission. The signal equalization technology enables the signal to generate a characteristic opposite to that of a channel, to "cancel" the "distortion" during channel transmission, thereby improving transmission effect. The signal equalization technology includes a CTLE, a feed-forward equalizer (FFE), a DFE, and the like.

The following describes a main link equalization architecture.

1. Link Equalization Architecture Based on the CTLE, the FFE, and the DFE

FIG. 1 shows a link equalization architecture based on the CTLE, the FFE, and the DFE. The link equalization architecture includes a transmit end and a receive end, shown by a dashed-line box in FIG. 1.

The transmit end includes an FFE and an error control encoder (optional). A signal output by the FFE is transmitted to the receive end through a channel.

The receive end includes a clock and data recovery (CDR) module, a least mean square (LMS) adaption module, a CTLE, an analog-to-digital converter (ADC), an FFE, a DFE, and an MLSE module, and the MLSE module serves as an error correction module.

Arrows in FIG. 1 indicate signal flow directions between the modules. The LMS adaptation module sends a coefficient (c_dfe) of the DFE to the DFE, the FFE, and the MLSE. c_dfe includes a tap coefficient $\alpha$ of the DFE and an interval dlevel between two adjacent levels in a PAM signal. A signal output by the FFE is dfe_input of the DFE, and dfe_input is input to the DFE and the MLSE. The DFE outputs, to the MLSE, dfe_output obtained through equalization of dfe_output. The DFE further outputs a decision signal (sym) obtained through decision of the equalized output signal and a difference (err) between the decision signal and the equalized output signal to the LMS adaptation module and the MLSE. The MLSE performs error correction on the decision signal (sym) based on a received signal, and then outputs a corrected decision signal (sym_dly).

A DFE equalizer of the foregoing link equalization architecture causes a bit error transmission phenomenon of a link. This increases a total bit error rate. Left SoB and EoB become a main source of a bit error of the link after a precoding technology is used. This affects further improvement of link quality. Although the MLSE has better equalization effect, the technical solution has problems such as high complexity, a high delay, and high power consumption.

2. Another Link Equalization Architecture Based on the CTLE, the FFE, and the DFE FIG. 2 shows another link equalization architecture based on the CTLE, the FFE, and the DFE.

Figure 2:
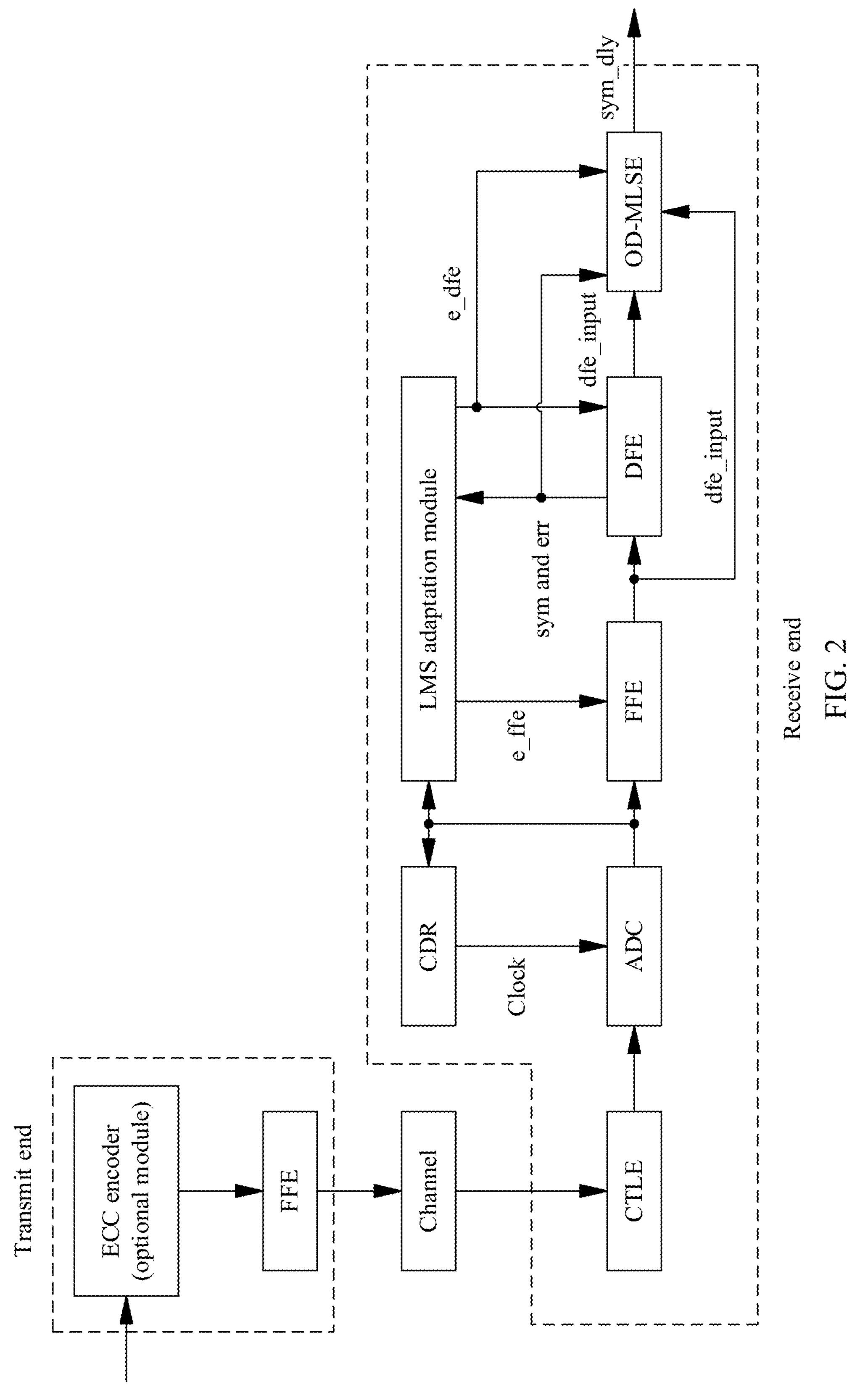
FIG. 2 is a schematic diagram of another link equalization architecture according to an embodiment.

A difference between the link equalization architecture shown in FIG. 2 and the link equalization architecture shown in FIG. 1 lies in that an error correction module in FIG. 2 is OD-MLSE. The link equalization architecture shown in FIG. 2 is an on-demand start MLSE solution based on an OD-MLSE module equalization technology. In the solution, an MLSE function module is started by using an end of burst error detection EoBD technology.

Performance of the solution is similar to that of the solution shown in FIG. 1, but complexity and power consumption of the solution in FIG. 2 are reduced compared with those of the solution shown in FIG. 1. In addition, although the solution shown in FIG. 2 is on-demand start MLSE, starting the MLSE causes problems such as increases in area and power consumption of a system, high complexity, and a delay increase.

It may be understood that the two link equalization architectures shown in FIG. 1 and FIG. 2 can eliminate ISI without amplifying noise. However, the foregoing two link equalization architectures each include a DFE.

Figure 3:
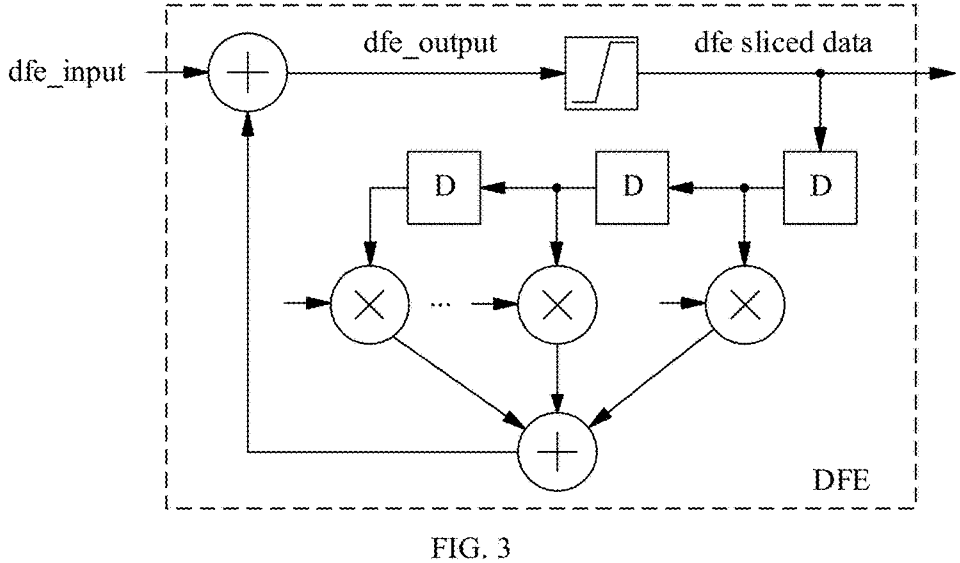
FIG. 3 is a schematic diagram of a decision feedback structure according to an embodiment.

As shown in FIG. 3, the DFE has a decision feedback structure. Specifically, the DFE includes adders (circles in which "+" is located in FIG. 3), a register (a block in which a character "D" is located in FIG. 3), a multiplier (a circle in which "x" is located in FIG. 3), and a decider (a block in which a broken line is located in FIG. 3).

A principle of the decision feedback structure of the DFE is as follows: When the DFE receives dfe_input, the DFE equalizes the current input signal based on dfe_sliced data to obtain dfe_output. Then, the DFE performs decision on dfe_output by using the decider, to obtain dfe_sliced data corresponding to dfe_output.

It is clear that, when an incorrectly determined bit error occurs in the DFE, due to existence of the decision feedback structure, the bit error affects decision of a next input signal, resulting in bit error transmission.

To resolve a problem of bit error transmission, the transmit end usually pre-encodes to-be-sent data by using a 1/(1+D) precoding technology, and the receive end restores original data by using a decoding technology of (1+D) precoding. The precoding technology can suppress bit error transmission. However, the precoding technology still cannot detect and eliminate an error at the SoB. This limits further reduction of the bit error rate of the link.

Figure 4:
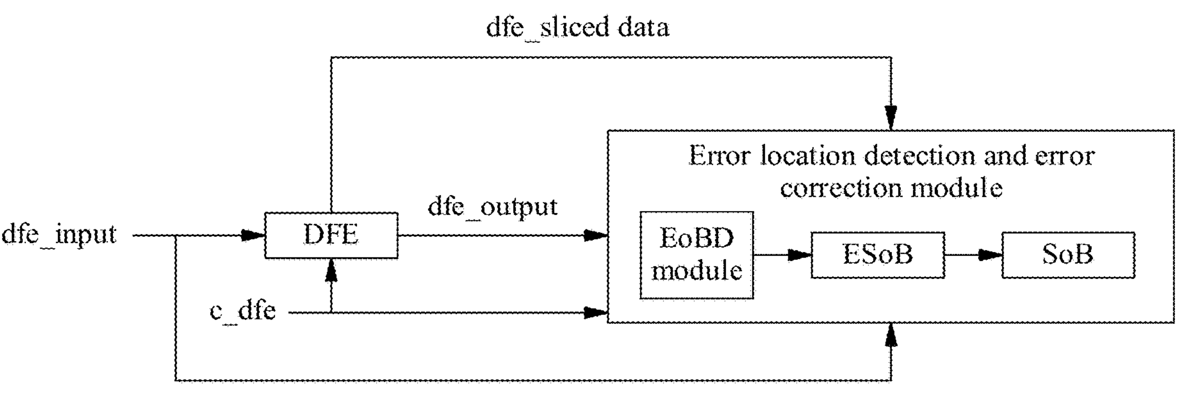
FIG. 4 is a schematic diagram of still another link equalization architecture according to an embodiment.

FIG. 4 provides a link equalization architecture. The link equalization architecture provides an EoB detection (EoBD) end of burst error detection technology.

As shown in FIG. 4, a working principle of the link equalization architecture is as follows: The DFE receives dfe_input, and outputs information such as dfe_output, dfe_sliced_data, and c_dfe to an error location detection and error correction module. The error location detection and error correction module determines an EoB error based on error transmission introduced by the DFE, and then determines a start of burst error SoB based on the end of burst error.

However, the technology shown in FIG. 4 is applicable to a case in which a value of a (also referred to as a tap coefficient) of a channel (1+aD) is large, for example, a scenario in which a tap coefficient is close to 1, or a tap coefficient is greater than 0.5 and less than 1. When a is small, an overflow probability of error transmission is small, and the error location detection and error correction module may easily fail to identify a location of the EoB. This results in missing detection and a loss of error detection and error correction performance.

Figure 5:
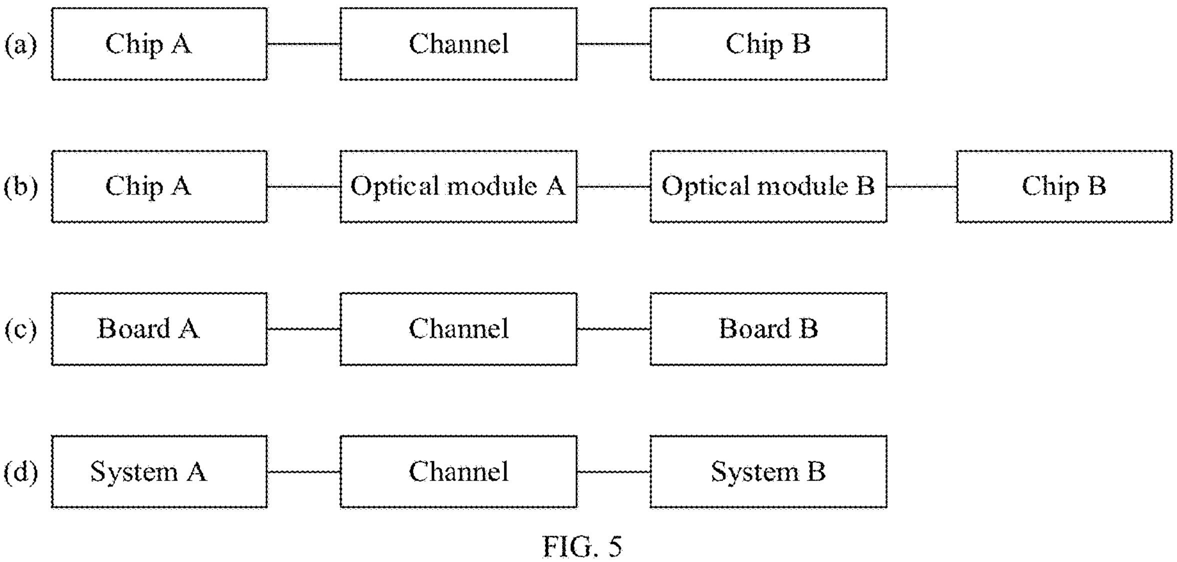
FIG. 5 is a schematic diagram of a high-speed interconnection scenario according to an embodiment.

In view of this, embodiments provide a location detection method and a related apparatus, which may be used in a scenario in which high-speed interconnection is required. An interconnection link may be one of the following types:

1. an interconnection link for interconnection between a chip and a chip through a channel, for example, an interconnection link for interconnection between a chip A and a chip B through a channel as shown in (a) in FIG. 5;
2. an interconnection link between a chip and an optical module, and an interconnection link between optical modules, for example, as shown in (b) in FIG. 5, an interconnection link between a chip A and an optical module A, an interconnection link between an optical module A and an optical module B, and an interconnection link between an optical module B and a chip B;
3. an interconnection link for interconnection between a board and a board through a channel, for example, as shown in (c) in FIG. 5, an interconnection link for interconnection between a board A and a board B through a channel; or
4. an interconnection link for interconnection between a system and a system through a channel, for example, as shown in (d) in FIG. 5, an interconnection link for interconnection between a system A and a system B through a channel. Herein, the system may be a terminal device such as a general-purpose computer, a router, a switch, or even a mobile phone.

In the foregoing four interconnection links, the interconnection link may be an electrical link such as a printed circuit board (PCB) or a coaxial cable, or may be an optical link or a wireless link.

Figure 6:
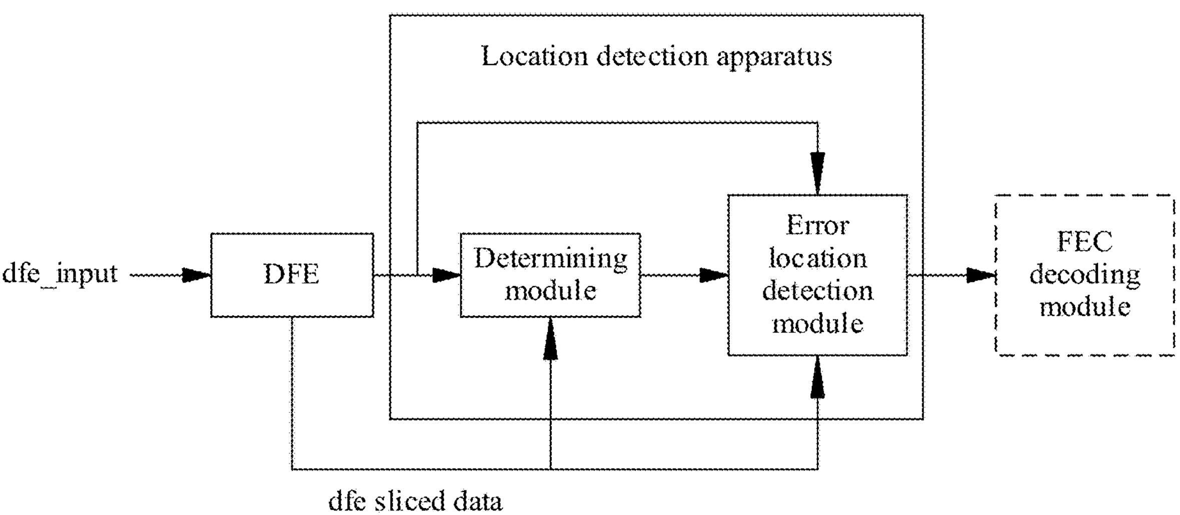
FIG. 6 is a schematic diagram of a structure of a location detection apparatus according to an embodiment.

FIG. 6 is a schematic diagram of a structure of a location detection apparatus according to an embodiment.

The location detection apparatus includes a determining module and an error location detection module. It may be understood that FIG. 6 is merely a schematic diagram of the location detection apparatus. The location detection apparatus may include more or fewer modules than those in FIG. 6.

The determining module is configured to receive a DFE coefficient output by a DFE, where the DFE coefficient includes a tap coefficient. The determining module compares a relationship between the tap coefficient and a preset threshold, and determines a detection method of the error location detection module based on the relationship.

The error location detection module determines, according to the determined detection method and based on related data (which includes but is not limited to dfe_input, dfe_output, dfe_sliced_data, and c_dfe) output by the DFE, a location of a decision signal in which an error occurs in a decision signal sequence. The location includes a start of burst error SoB and an end of burst error EoB.

The error location detection module includes two detection methods:

Detection method 1: The error location detection module detects a start of burst error SoB, and performs tracking, to back under triggering of the SoB, on a decision signal sequence transmitted from the DFE, to detect an end of burst error EoB.

Detection method 2: The error location detection module detects an end of burst error EoB, and performs backtracking, under triggering of the EoB, on a decision signal sequence transmitted from the DFE, to detect a start of burst error SoB.

Further, when the tap coefficient is less than or equal to the preset threshold, the determining module determines that the detection method of the error location detection module is the detection method 1. When the tap coefficient is greater than the preset threshold, the determining module determines that the detection method of the error location detection module is the detection method 2.

The preset threshold may be set based on an actual bit error ratio (BER) of a channel. For example, if the preset threshold is 0.6, and the actual bit error ratio of the channel is 0.12; if the preset threshold is 0.7, the actual bit error ratio of the channel is 0.14; if the preset threshold is 0.8, the actual bit error ratio of the channel is 0.13. The preset threshold may be set to 0.6, so that the actual bit error ratio of the channel is optimal or meets a preset requirement.

Figure 7:
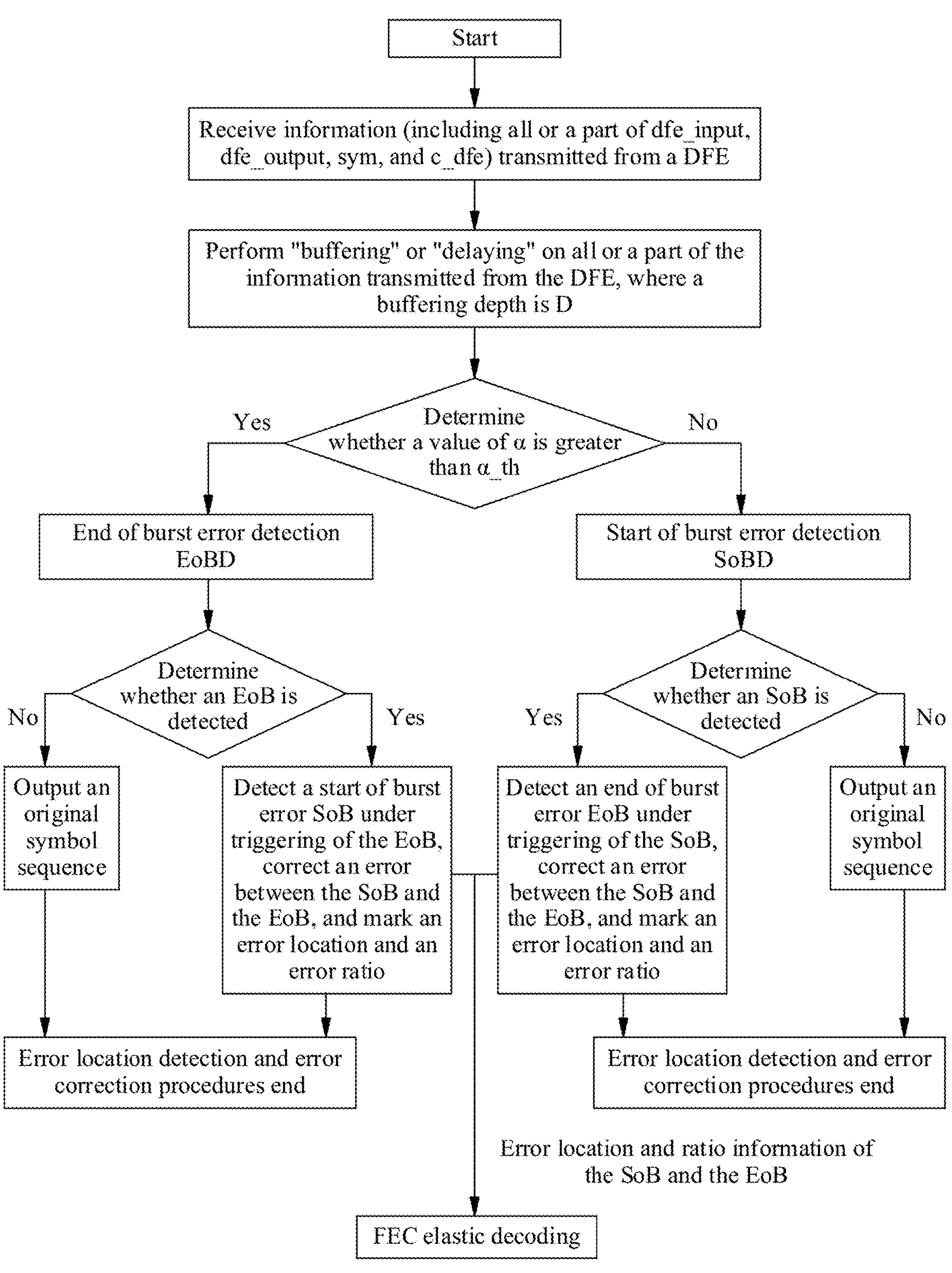
FIG. 7 is a schematic diagram of a detection method according to an embodiment.

Specifically, FIG. 7 shows a burst error location detection method based on the architecture shown in FIG. 6. The method includes the following steps.

Step 1: A location detection apparatus receives information transmitted from a DFE.

The information includes (but is not limited to) dfe_input, dfe_output, dfe_sliced_data, and c_dfe.

The DFE may be located inside the location detection apparatus, or may be located outside the location detection apparatus.

Step 2: The location detection apparatus performs "buffering" or "delaying" on all or a part of the information transmitted by the DFE, and a depth of buffered or delayed data is D.

The buffered or delayed data may be used for subsequent error correction, or when the location detection apparatus does not detect a bit error, the buffered data is output.

D may be a length preset by the location detection apparatus, or may be a length of a decision signal sequence transmitted from the DFE.

Step 3: The determining module of the location detection apparatus detects whether a value of a is greater than a preset threshold $\alpha$_th.

0<$\alpha$_th<1. Certainly, a corresponding preset threshold may also be set based on a specific channel environment.

If $\alpha$>$\alpha$_th, go to step 4. If $\alpha$≤$\alpha$_th, go to step 5.

Step 4: If $\alpha$>$\alpha$_th, the determining module determines that the detection method of the location detection module is the detection method 2.

Specifically, step 4 includes the following steps:

The location detection module determines an EoB, and performs backtracking, under triggering of the EoB, on the decision signal sequence transmitted from the DFE (a backtracking length is L, and L≤D).

If the start of burst error SoB is detected in the backtracking process, the error location detection module performs error correction on a decision signal sequence transmitted between the SoB and the EoB, and outputs a decision signal sequence obtained through error correction.

If the location detection module does not detect the EoB, it indicates that there is no burst error in the decision signal sequence, and the error location detection module outputs an original decision signal sequence. Error location detection and error correction procedures end.

Step 5: If $\alpha$≤$\alpha$_th, the determining module determines that the detection method of the location detection module is the detection method 2.

Specifically, step 5 includes the following steps:

The error location detection module determines the SoB, and performs tracking, to back under triggering of the SoB, on the decision signal sequence transmitted from the DFE (a tracking length is L, and LSD).

If the error location detection module detects the end of burst error EoB, the error location detection module performs error correction on the decision signal sequence transmitted between the SoB and the EoB, and outputs a decision signal sequence obtained through error correction. If the error location detection module does not detect the SoB, an original decision signal sequence is output. Error location detection and error correction procedures end.

Step 6: The location detection apparatus transmits information such as error locations and error ratios of the EoB and the SoB to an FEC, and the FEC performs elastic decoding.

It should be noted that the FEC is an error control technology, to be specific, redundant information is added to a sent signal, so that an FEC decoding module at a receive end detects, based on the redundant information, an error that may occur in a received signal, and corrects the error. A Reed-Solomon (RS) code is usually used for protection and check of various data. The RS code can be represented as RS (N, K). N indicates a codeword length, and K indicates a valid information length.

The location detection apparatus system and the applicable scenario described in embodiments are intended to describe the technical solutions in embodiments more clearly, and do not constitute a limitation on the technical solutions provided in embodiments. A person of ordinary skill in the art may learn that the technical solutions provided in embodiments are also applicable to a similar technical problem as a technical architecture evolves and a new service scenario emerges.

The following describes the location detection method in detail.

It should be noted that, in the following embodiments, names of messages, names of parameters in messages, or the like are merely examples, and there may be other names during specific implementation. Unified descriptions are provided herein and details are not described below again.

Figure 8:
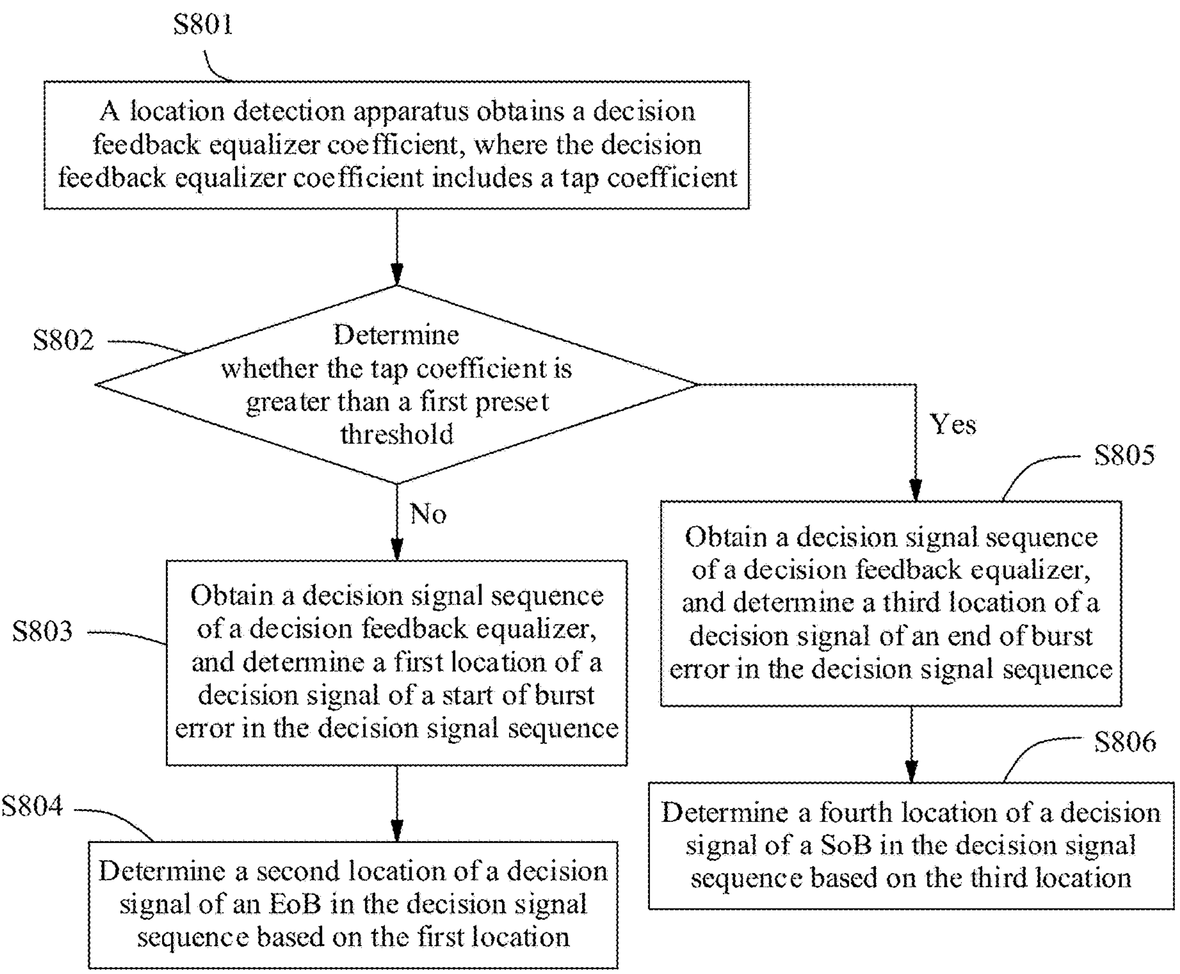
FIG. 8 is a schematic flowchart of a location detection method according to an embodiment.

An embodiment provides a location detection method, namely, a burst error location detection method based on the architecture shown in FIG. 6. The location detection method is applied to a burst error detection process. Refer to FIG. 8. The location detection method includes the following steps.

S801: A location detection apparatus obtains c_dfe, where c_dfe includes a tap coefficient.

The location detection apparatus receives c_dfe output by a DFE.

In another embodiment, c_dfe may further include a DFE equalizer coefficient, and a level difference between two adjacent levels of a decision signal obtained through decision of the DFE.

S802: Determine whether the tap coefficient is greater than a first preset threshold.

It may be understood that, in embodiments, the error location detection method may be determined based on a relationship between the tap coefficient and the first preset threshold. Specifically, because the DFE is a feedback equalizer, when a signal is incorrectly determined, error transmission is easily caused. When the tap coefficient is greater than the first preset threshold and the signal is incorrectly determined, overflow is easily caused by error transmission, and it is convenient to identify a location of an EoB. When the tap coefficient is less than or equal to the first preset threshold and the signal is incorrectly determined, overflow is not easily caused by error transmission, and it is inconvenient to identify a location of an EoB, but it is convenient to identify a location of a SoB. Therefore, different detection methods are determined based on different relationships between the tap coefficient and the first preset threshold, to reduce a probability of missing detection and reduce a loss of error detection and error correction performance.

For example, in S802, when the tap coefficient is less than or equal to the first preset threshold, S803 is performed. When the tap coefficient is greater than the first preset threshold, S805 is performed.

S803: Obtain a decision signal sequence of a decision feedback equalizer, and determine a first location of a decision signal of the start of burst error in the decision signal sequence.

The decision signal sequence is a sequence output by the DFE. For example, refer to FIG. 6. The location detection apparatus includes an error location detection module. The DFE sends the decision signal sequence to the error location detection module. Correspondingly, the error location detection module receives the decision signal sequence from the DFE.

For example, the decision signal sequence includes a plurality of decision signals. Table 2 is used as an example. A location of one decision signal corresponds to one decision signal identity. Table 2 shows locations of 18 decision signals: a decision signal identity 1 to a decision signal identity 18. The decision signal sequence includes sign values of the decision signals at the foregoing 18 signal locations.

S804: Determine a second location of a decision signal of the EoB in the decision signal sequence based on the first location.

Specifically, information transmitted from the DFE may be tracked to back under triggering of the SoB, to determine the location of the end of burst error EoB.

Therefore, when the tap coefficient of the feedback equalizer is less than the first preset threshold and the signal is incorrectly determined, overflow is not easily caused by error transmission, and it is inconvenient to identify the location of the EoB, but it is convenient to identify the location of the SoB. Therefore, the detection method is determined based on the relationship between the tap coefficient and the first preset threshold, to reduce the probability of missing detection and reduce the loss of the error detection and error correction performance.

In an embodiment, an implementation process of S804 may be, for example, but is not limited to, the following descriptions:

The location detection apparatus first determines a possible range of the SoB, and then determines a "location of the decision signal of the EoB in the decision signal sequence" within the range.

Specifically, the location detection apparatus performs tracking, to back, on the information based on the location of the SoB to find an LEOB error, where a region between the SoB and the LEOB is a first decision region in which the SoB may appear; and then searches for the location of the SoB within a bit error transmission pattern range in the first decision region.

The first decision region includes a location of the LEOB, and further includes a location of a decision signal of the SoB and a location of a decision signal of the LEoB.

S805: Obtain a decision signal sequence of a decision feedback equalizer, and determine a third location of the decision signal of the end of burst error in the decision signal sequence.

S806: The location detection apparatus determines a fourth location of the decision signal of the SoB in the decision signal sequence based on the third location.

Therefore, when the tap coefficient is greater than or equal to the first preset threshold, the location detection apparatus first determines the third location of the decision signal of the end of burst error in the decision signal sequence, and then determines the fourth location of the decision signal of the SoB in the decision signal sequence based on the third location.

It may be understood that, in embodiments, an implementation process of S803 may be, for example, but is not limited to the following descriptions.

Step 1: The location detection apparatus obtains a target value 1 corresponding to a signal location A in the decision signal sequence.

The signal location A is a location of one or more decision signals in the decision signal sequence. For example, Table 2 is used as an example. The signal location A may be one or more decision signal identities in the decision signal identity 1 to the decision signal identity 18.

The target value 1 includes at least one of the following: a sign value of a decision signal at the signal location A, an equalization value corresponding to the signal location A, or a difference corresponding to the signal location A. The difference corresponding to the signal location A is a difference between the sign value of the decision signal at the signal location A and the equalization value corresponding to the signal location A.

For example, the signal location A includes a location of one decision signal. Refer to FIG. 6. In a case of "the target value 1 includes the difference corresponding to the signal location A", the DFE sends the difference to the error location detection module. Correspondingly, the error location detection module receives the difference from the DFE. In a case of "the target value 1 includes the sign value of the decision signal at the signal location A and the equalization value corresponding to the signal location A", the DFE sends the sign value of the decision signal and the equalization value to the error location detection module. Correspondingly, the error location detection module receives the sign value of the decision signal and the equalization value that are from the DFE. In a case of "the target value 1 includes the sign value of the decision signal at the signal location A, the equalization value corresponding to the signal location A, and the difference corresponding to the signal location A", the DFE sends the sign value of the decision signal, the equalization value, and the difference to the error location detection module. Correspondingly, the error location detection module receives the sign value of the decision signal, the equalization value, and the difference that are from the DFE.

It should be noted that, when the signal location A includes a plurality of signal locations, the DFE transmits, to the error location detection module, at least one of the following: a decision signal sequence, an equalization value sequence, or a difference sequence, that corresponds to the signal location A.

Step 2: The location detection apparatus determines, based on the target value 1, a location of the decision signal of the start of burst error is in the decision signal sequence.

For example, the error location detection module determines, from the signal location A based on the sign value of the decision signal at the signal location A and an equalization value corresponding to a signal location 1, a signal location as the location of the decision signal of the SoB in the decision signal sequence. Alternatively, the error location detection module determines, from the signal location A based on a difference corresponding to a signal location 1, a signal location as the location of the decision signal of the SoB in the decision signal sequence.

In an embodiment, the location of the decision signal of the SoB in the decision signal sequence is determined based on a relationship between a difference and a second preset threshold. Specifically, a difference corresponding to each decision signal in the decision signal sequence is determined. If the difference is greater than the second preset threshold, the decision signal is the location of the decision signal of the SoB.

For example, the signal location A includes a location of a decision signal, and "the signal location A is implemented as a decision signal identity 9 in Table 2". The second preset threshold is 0.4, the sign value of the decision signal at the signal location A is "0", the equalization value corresponding to the signal location A is "0.58", and the difference corresponding to the signal location A is "−0.42". The error location detection module determines, based on the difference (namely, 0.42) being greater than the preset threshold 0.4, that a signal location identified by the decision signal identity 9 is the location of the decision signal of the SoB in the decision signal sequence. Alternatively, the error location detection module determines, based on the sign value (namely, 1) of the decision signal at the signal location A and the equalization value (namely, 0.58) corresponding to the signal location A, that the signal location identified by the decision signal identity 9 is the location of the decision signal of the SoB in the decision signal sequence.

It should be noted that, in a case of "the signal location A includes locations of a plurality of decision signals", the error location detection module determines a location of each decision signal at the signal location A. For a specific process, refer to the description in the previous paragraph. Details are not described herein again.

Further, if it is determined that a difference corresponding to at least two decision signals in the decision signal sequence is greater than the second preset threshold, a decision signal whose difference is greater than the second preset threshold appears for the first time in the decision signal sequence is set to the location of the decision signal of the SoB.

The second preset threshold may be preset in the location detection apparatus, and the second preset threshold may be a fixed value, for example, may be preset based on a channel parameter processed by the location detection apparatus. Certainly, the second preset threshold may also change in real time based on the channel parameter.

In an embodiment, the second preset threshold may be "$\varepsilon \cdot \alpha \cdot$dlevel", where & indicates a preset coefficient corresponding to an error abnormality of the DFE. $\alpha \cdot$dlevel may be obtained when the location detection apparatus obtains the decision signal, and dlevel may be an interval between two adjacent levels of a PAM-N signal. Certainly, $\varepsilon \cdot \alpha \cdot$dlevel may be a fixed value preset in an error correction apparatus.

Therefore, when the location detection apparatus obtains the target value 1 at the signal location A, for example, the location detection apparatus obtains at least one of the sign value of the decision signal at the signal location A, the equalization value corresponding to the signal location A, and the difference corresponding to the signal location A, and the location of the decision signal of the SoB in the decision signal sequence is determined based on a relationship between the target value 1 and the second preset threshold. This provides a basis for determining the location of the decision signal of the EoB.

Figures 9, 10:
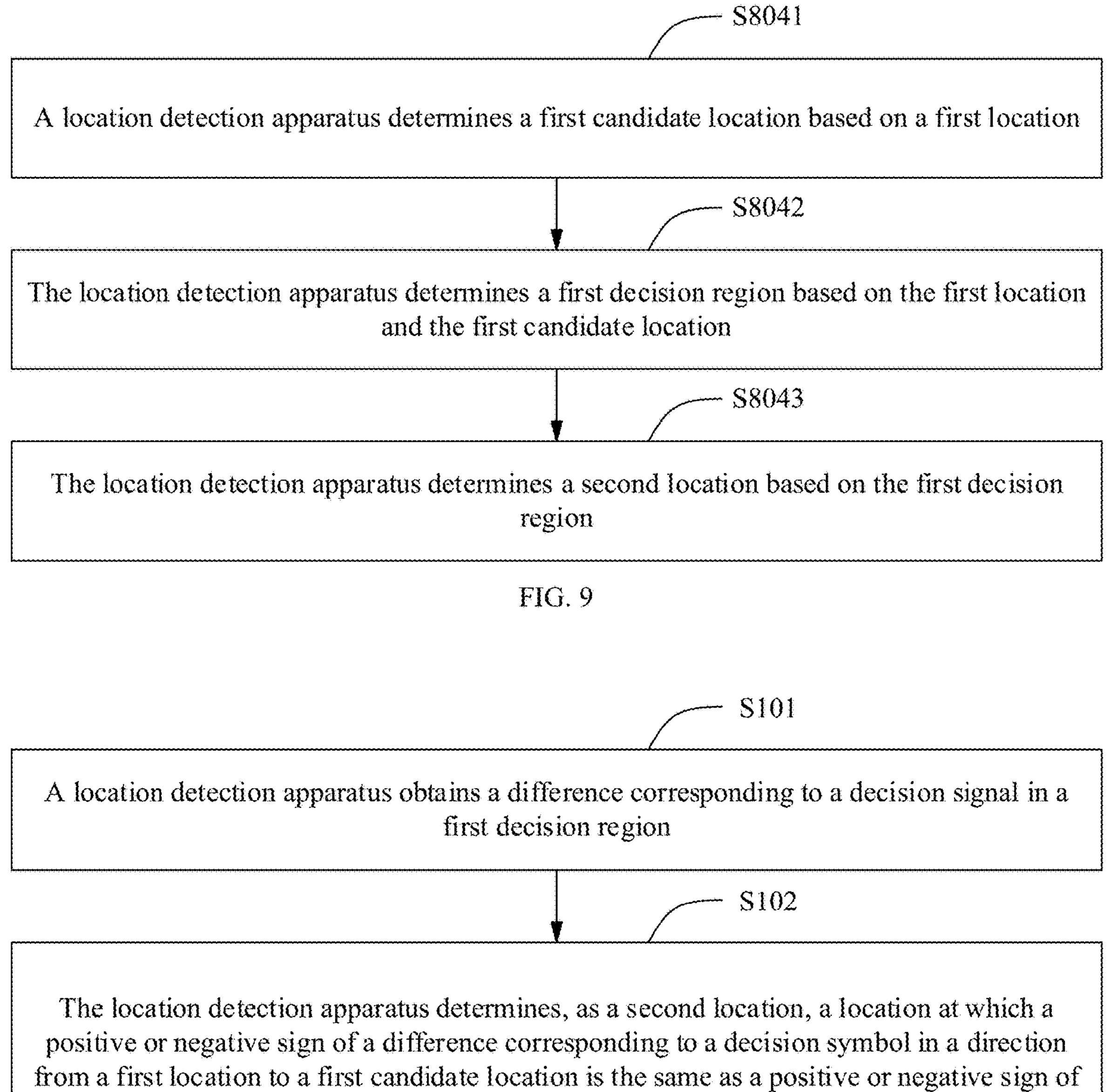
FIG. 9 is a schematic flowchart of a method for determining a second location according to an embodiment.
FIG. 10 is a schematic flowchart of another method for determining a second location according to an embodiment.

FIG. 9 is an implementation process of S804 in FIG. 8. In some embodiments, S804 further includes the following steps.

S8041: The location detection apparatus determines a first candidate location based on the first location.

The first candidate location is a candidate location at which the decision signal of the end of burst error appears latest in the decision signal sequence. That is, the first candidate location is a location at which a decision signal of an LEoB error may appear in the decision signal sequence. In other words, a location at which the decision signal of the SoB may appear is described as a "candidate location".

S8042: The location detection apparatus determines the first decision region based on the first location and the first candidate location.

The first decision region includes the first candidate location and a location corresponding to a decision signal between the first location and the first candidate location.

For example, Table 2 is still used as an example. The first decision region includes a "decision signal identity 14" and a signal location from a "decision signal identity 10" to the "decision signal identity 14".

For example, Table 2 is used as an example. When the first candidate location is the "decision signal identity 14" and the first location is the "decision signal identity 9", the first decision region includes a signal location from the "decision signal identity 10" to the "decision signal identity 14". After obtaining the "location of the decision signal of the SoB" and the target value 2, the error location detection module performs back-tracking, from the location of the decision signal of the SoB, on decision signals corresponding to the "decision signal identity 9" to the "decision signal identity 14" in the decision signal sequence, and determines the location of the decision signal of the EoB in the decision signal sequence based on target values 2 at different signal locations.

S8043: The location detection apparatus determines the second location based on the first decision region.

Specifically, the second location is selected from the first decision region. The error location detection module of the location detection apparatus tracks to back from the first location to the first candidate location and then ends.

Therefore, when the location detection apparatus determines a latest location at which the decision signal of the EoB may appear in the decision signal sequence, a range within which the location detection apparatus searches for the decision signal of the EoB is reduced to some extent, and a calculation amount of the location detection apparatus is further reduced.

It should be noted that, as shown in FIG. 9, S8041 may be implemented in a plurality of manners. For example, the plurality of manners may include but are not limited to a case shown in the following embodiment. S8041 includes the following steps.

Step 11: The location detection apparatus determines, based on a sign value of a decision signal at a signal location F and an estimated error pattern corresponding to the signal location F, a DFE check value corresponding to the signal location F.

The signal location F includes a location of at least one decision signal that is in the decision signal sequence and that is after the decision signal of the SoB. For example, Table 2 is still used as an example. The signal location D includes a location of a decision signal after the decision signal identity 9. For example, the signal location D is implemented as a signal location corresponding to a “decision signal identity 11”, or the signal location D is implemented as a signal location corresponding to a “decision signal identity 12”.

The estimated error pattern corresponding to the signal location F is determined based on an error transmission feature of the DFE. For example, Table 2 is still used as an example. If decision noise corresponding to the location (namely, the decision signal identity 9) of the decision signal of the SoB is “−0.42”, it indicates that an equalization value is less than a sign value of the decision signal. Therefore, the error location detection module determines that an estimated error pattern corresponding to the location of the decision signal of the SoB is “+1”. Based on the error transmission feature of the DFE, an estimated error pattern corresponding to a signal location after the decision signal identity 9 is shown in Table 2. For example, an estimated error pattern corresponding to the decision signal identity 14 is “−1”, and an estimated error pattern corresponding to a decision signal identity 13 is “+1”.

For example, an implementation process of S8041 is as follows: The location detection apparatus performs subtraction on the “sign value of the decision signal at the signal location F” and the “estimated error pattern corresponding to the signal location F”, to obtain the DFE check value corresponding to the signal location F. For example, “the signal location F is implemented as the decision signal identity 14” is used as an example. The “sign value of the decision signal at the signal location F” is “3”, and an “estimated error pattern corresponding to the signal location D” is “−1”. Subtraction is performed on the two, to obtain the “DFE check value corresponding to the signal location F”, namely, “4”. For another example, “the signal location F is implemented as a decision signal identity 15” is used as an example. The “sign value of the decision signal at the signal location F” is “1”, and an “estimated error pattern corresponding to the signal location D” is “+1”. Subtraction is performed on the two, to obtain the “DFE check value corresponding to the signal location F”, namely, “1”.

Step 12: The location detection apparatus compares the DFE check value corresponding to the signal location F with a preset range A, to obtain a comparison result.

The preset range A is determined based on a sign value obtained through DFE decision. For example, Table 2 is used as an example. The sign value obtained through DFE decision includes at least one value of “0”, “1”, “2”, and “3”. Therefore, the preset range 2 is [0, 3].

The comparison result indicates a signal location, whose DFE check value exceeds the preset range A, in the signal location F.

For example, “the signal location F is implemented as the decision signal identity 13” is used as an example. An SoBD module of the location detection apparatus compares a “DFE check value corresponding to the decision signal identity 13” with the preset range A, to obtain a comparison result. For example, the second comparison result indicates that a “DFE check value corresponding to the decision signal identity 13” does not exceed the preset range A.

Step 13: The location detection apparatus determines the first candidate location based on the comparison result.

For example, if the second comparison result indicates “a DFE check value corresponding to a signal location in the signal location F exceeds the preset range A”, the location detection apparatus determines that a signal location (namely, a signal location at which the DFE check value exceeds the preset range A) indicated by the comparison result is the first candidate location. Otherwise, if the comparison result indicates “the DFE check value corresponding to the signal location F does not exceed the preset range A”, the location detection apparatus determines that the signal location F does not include the first candidate location. Herein, Table 2 is still used as an example. It is determined that a “DFE check value corresponding to the decision signal identity 12” does not exceed the preset range A. In this case, the signal location corresponding to the “decision signal identity 12” is not the first candidate location. The error location detection module further determines whether a signal location corresponding to the “decision signal identity 13” is the first candidate location. If the signal location corresponding to the “decision signal identity 13” is not the first candidate location, the error location detection module continues to determine a status of the “decision signal identity 14”, and the process is repeated until the error location detection module determines that a “DFE check value (namely, 4) corresponding to the “decision signal identity 14” exceeds the preset range A. In this case, a signal location corresponding to the “decision signal identity 14” is the first candidate location.

Therefore, when the location detection apparatus determines DFE check values corresponding to signal locations, the location detection apparatus can determine, based on value statuses of the DFE check values, which signal location is a latest signal location at which the decision signal of the EoB may appear in the decision signal sequence, namely, the first candidate location.

It should be noted that, as shown in FIG. 9, S8043 may be implemented in a plurality of manners, and Embodiment 1 and Embodiment 2 are separately used below for description.

Embodiment 1

As shown in FIG. 10, in Embodiment 1, S8043 includes the following steps.

S101: The location detection apparatus obtains a difference corresponding to a decision signal in the first decision region.

The difference is a difference between a sign value of the decision signal and a corresponding equalization value.

For example, the difference may be calculated according to the following formula: Difference=sign value of dfe_sliced_data-dfe_output

S102: The location detection apparatus determines, as a second location, a location at which a positive or negative sign of a difference corresponding to a decision signal in a direction from the first location to the first candidate location is the same as a positive or negative sign of a difference corresponding to a previously adjacent decision signal.

For example, Table 2 is used as an example. If the decision signal identity 9 to the decision signal identity 14 are locations corresponding to decision signals in the first decision region, differences corresponding to the locations are respectively −0.42, 0.22, 0.48, −0.03, 0.26, and 0.01, and positive or negative signs of the differences are respectively −, +, +, −, +, and +. Locations that have a same positive or negative sign value as differences corresponding to previous locations are respectively the decision signal identity 11 to the decision signal identity 14. Because the decision signal identity 11 is a location at which positive or negative sign values of differences corresponding to adjacent locations from the decision signal identity 10 to the decision signal identity 14 are the same for the first time, a location of the decision signal identity 11 is identified as the location of the EoB, namely, the second location of the decision signal of the end of burst error in the decision signal sequence.

Further, if there is more than one location having a same positive or negative sign of a difference corresponding to a decision signal in the decision signal sequence from the first location to the first candidate location, the location at which the same positive or negative sign of the difference appears for the first time is set as the EoB.

Therefore, when the location detection apparatus determines the latest location at which the decision signal of the EoB may appear in the decision signal sequence, the location having the same positive or negative sign of the difference corresponding to the decision signal at the previously adjacent location is set as the second location of the decision signal of the end of burst error in the decision signal sequence based on a positive or negative sign of a difference corresponding to each decision signal identity in the first decision region determined based on the SoB and the LEoB.

Embodiment 2

Figures 11, 12:
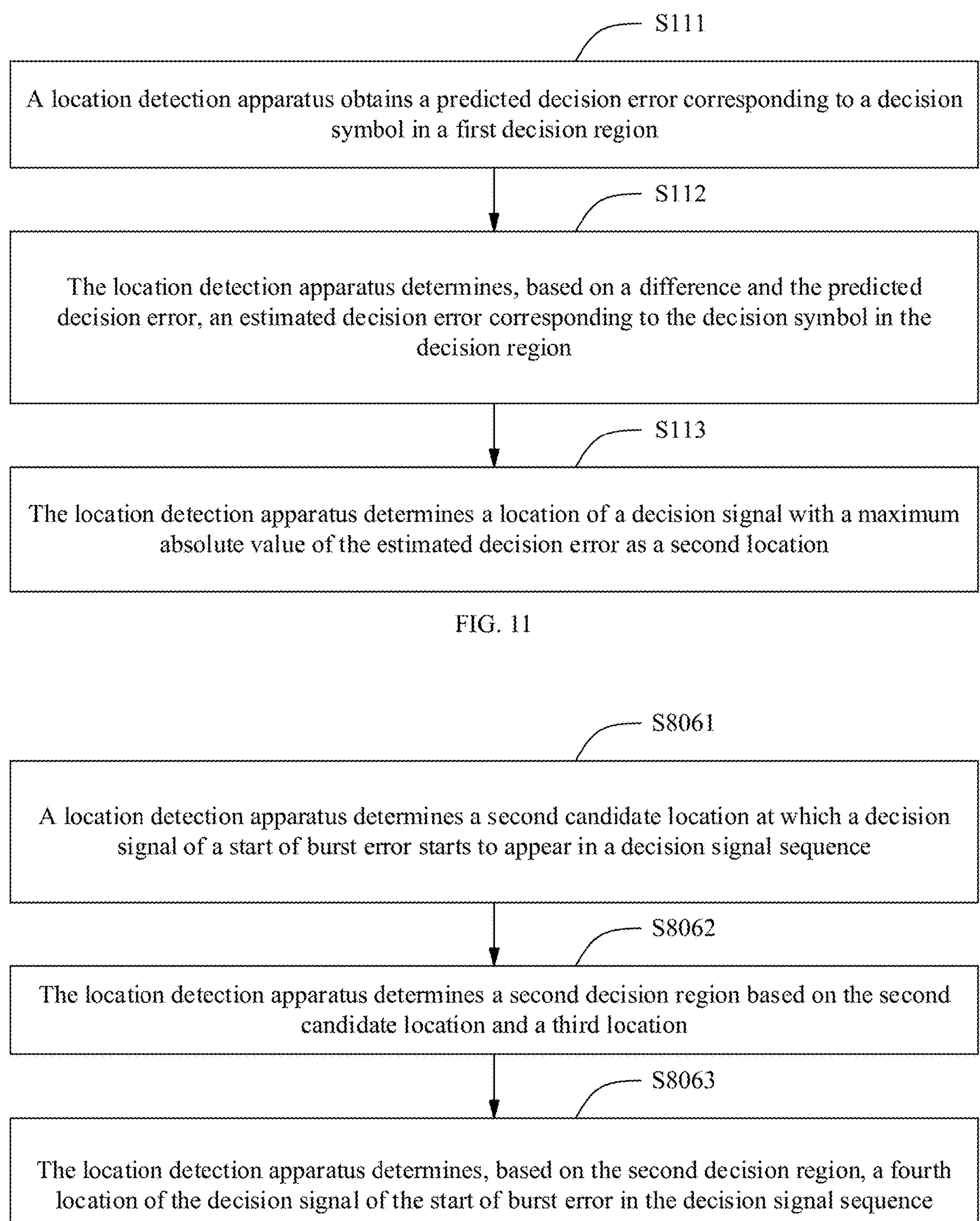
FIG. 11 is a schematic flowchart of still another method for determining a second location according to an embodiment.
FIG. 12 is a schematic flowchart of a method for determining a fourth location according to an embodiment.

As shown in FIG. 11, in Embodiment 2, S8043 includes the following steps.

S111: The location detection apparatus obtains a predicted decision error corresponding to a decision signal in the first decision region.

The predicted decision error is also referred to as an error pattern.

For example, Table 2 is used as an example. A decision threshold of the SoB is 0.4, and a difference corresponding to the decision signal identity 9 is: Sign value of the decision signal (0.58)—equalization value (1) of the decision signal=−0.42. If an absolute value of the difference is greater than 0.4, it is determined that a location of the decision signal identity 9 is the SoB. Because the difference is a negative value, a predicted decision error corresponding to the decision signal identity 9 is +1. Due to burst error transmission, predicted decision errors corresponding to the decision signal identity 10 to the decision signal identity 14 are successively −1, +1, −1, +1, and −1. Certainly, in another embodiment, if the difference is a positive value, the predicted decision error corresponding to the decision signal identity is −1, and the predicted decision errors corresponding to the decision signal identities after the decision signal identity are successively +1, −1, +1, −1, and the like.

S112: The location detection apparatus determines, based on the difference and the predicted decision error, an estimated decision error corresponding to the decision signal in the decision region.

The estimated decision error is also referred to as an estimated error pattern.

The difference is a difference between dfe_sliced data of the decision signal and a corresponding dfe_output, and the estimated decision error is a difference between the difference and the predicted decision error. A calculation formula of the estimated decision error is as follows:

Estimated decision error-sign value-equalization value-predicted decision error.

S113: The location detection apparatus determines a location of the decision signal with a maximum absolute value of the estimated decision error as the second location.

For example, Table 2 is used as an example. Estimated decision errors corresponding to the decision signal identity 10 to the decision signal identity 14 are successively −0.58, 0.68, −0.53, 1.47, −1.08, and 0.84. Therefore, an estimated decision error with the maximum absolute value is 1.47. In other words, a location corresponding to the decision signal of the decision signal identity 14 is the second location.

Therefore, when the location detection apparatus determines the latest location at which the decision signal of the EoB may appear in the decision signal sequence, the location detection apparatus determines, based on an estimated decision error that corresponds to each decision signal identity and that is determined in the first decision region determined based on the SoB and the LEOB, that a location having a maximum absolute value of the estimated decision error is the second location of the decision signal of the end of burst error in the decision signal sequence.

It should be noted that, as shown in FIG. 8, in this embodiment, S806 may be implemented in a plurality of manners. For example, refer to FIG. 12. In some embodiments, S806 includes the following steps.

S8061: The location detection apparatus determines a second candidate location at which the decision signal of the start of burst error begins to appear in the decision signal sequence.

The second candidate location is a location of at least one decision signal before the decision signal of the end of burst error.

S8062: The location detection apparatus determines a second decision region based on the second candidate location and the third location.

The second decision region includes a decision signal of the second candidate location, and the second decision region further includes a decision signal that is before the third location and after the second candidate location.

S8063: The location detection apparatus determines, based on the second decision region, the fourth location of the decision signal of the start of burst error in the decision signal sequence.

Therefore, when the location detection apparatus determines an earliest location at which the decision signal of the SoB may appear in the decision signal sequence, a range within which the location detection apparatus searches for the decision signal of the SoB is reduced to some extent, and a calculation amount of the location detection apparatus is further reduced.

Figure 13:
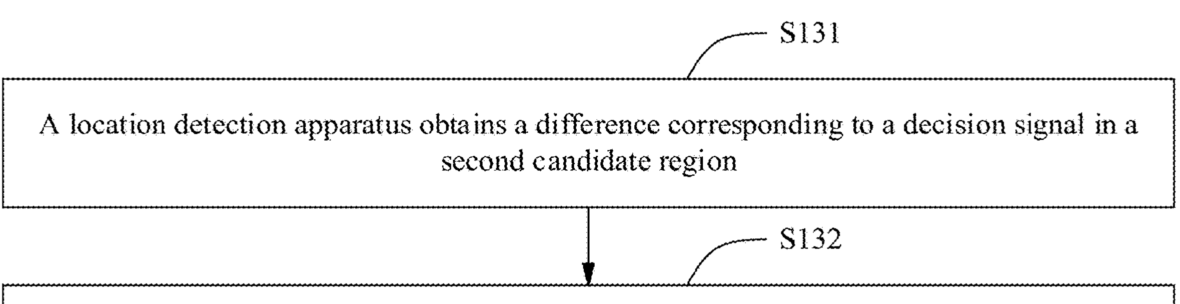
FIG. 13 is a schematic flowchart of a method for determining a fourth location according to an embodiment.

It should be noted that, as shown in FIG. 12, S8063 may be implemented in a plurality of manners. For example, as shown in FIG. 13, in some embodiments, S8063 includes the following steps.

S131: The location detection apparatus obtains a difference corresponding to a decision signal in the second decision region.

The difference is a difference between dfe_sliced data and a corresponding dfe_output.

S132: The location detection apparatus determines a location of a decision signal corresponding to a maximum absolute value of the difference corresponding to the decision signal in the second decision region as the fourth location.

For example, Table 1 is used as an example. The second decision region includes one signal location from a "decision signal identity 4" to a "decision signal identity 16". Differences (dfe_slicing_error) corresponding to the decision signal identity 4 to the decision signal identity 16 are successively 0.13, −0.15, 0.13, 0.10, 0.13, −0.49, 0.02, −0.13, −0.03, 0.11, −0.09, −0.04, and −0.04. The maximum absolute value of the difference is 0.49, that is, an absolute value of the difference corresponding to the decision signal identity 9 is maximum. In this case, the fourth location is a location of a decision signal corresponding to the decision signal identity 9.

Therefore, the second decision region in which the decision signal of the start of burst error in the decision signal sequence is located is determined based on the second candidate location and the third location of the decision signal of the end of burst error in the decision signal sequence, and the location of the decision signal corresponding to the maximum absolute value of the difference is determined in the region as the fourth location.

Figure 14:
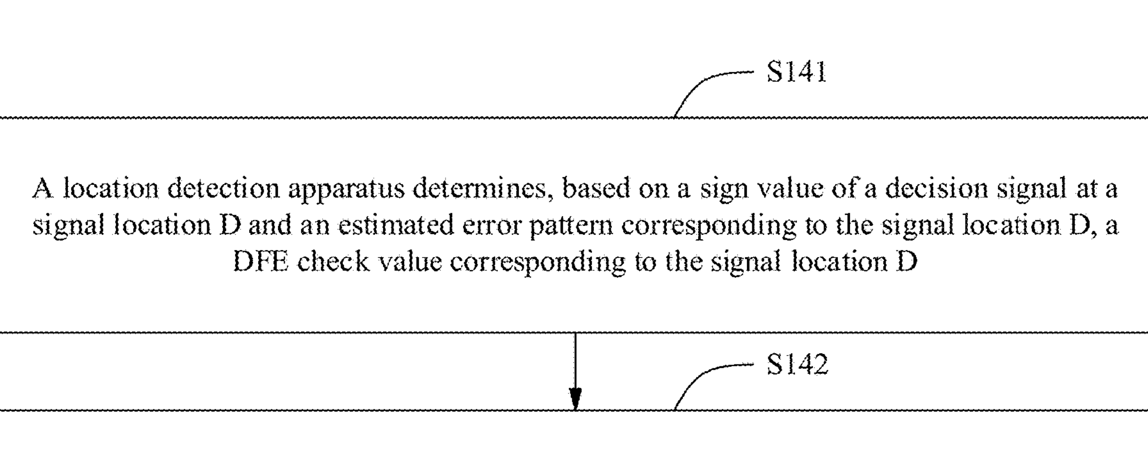
FIG. 14 is a schematic flowchart of a method for determining a second candidate location according to an embodiment.
Figure 14:

It should be noted that, as shown in FIG. 12, S8061 may be implemented in a plurality of manners. For example, as shown in FIG. 14, in some embodiments, S8061 includes the following steps.

S141: The location detection apparatus determines, based on a sign value of a decision signal at the signal location D and the estimated error pattern corresponding to the signal location D, a DFE check value corresponding to the signal location D.

The signal location D includes a location of at least one decision signal that is in the decision signal sequence and that is before the decision signal of the EoB. For example, Table 1 is still used as an example. The signal location D includes a location of a decision signal before a decision signal identity 17. For example, the signal location D is implemented as a signal location corresponding to the "decision signal identity 16", or the signal location D is implemented as a signal location corresponding to the "decision signal identity 15".

The estimated error pattern corresponding to the signal location D is determined based on an error transmission feature of the DFE. For example, Table 1 is still used as an example. If decision noise corresponding to the location (namely, the decision signal identity 17) of the decision signal of the EoB is "1.07", it indicates that an equalization value is greater than the sign value of the decision signal. Therefore, the location detection module determines that an estimated error pattern corresponding to the location of the decision signal of the EoB is "+1". Based on the error transmission feature of the DFE, an estimated error pattern corresponding to a signal location before the decision signal identity 17 is shown in Table 1. For example, an estimated error pattern corresponding to the decision signal identity 16 is "−1", and an estimated error pattern corresponding to the decision signal identity 15 is "+1".

For example, an implementation process of S141 is as follows: The error location detection module of the location detection apparatus performs subtraction on the "sign value of the decision signal at the signal location D" and the "estimated error pattern corresponding to the signal location D", to obtain the DFE check value corresponding to the signal location D. For example, "the signal location D is implemented as the decision signal identity 16" is used as an example. The "sign value of the decision signal at the signal location D" is "0", and the "estimated error pattern corresponding to the signal location D" is "−1". Subtraction is performed on the two, to obtain the "DFE check value corresponding to the signal location D", namely, "1". For another example, "the signal location D is implemented as the decision signal identity 15" is used as an example. The "sign value of the decision signal at the signal location D" is "0", and the "estimated error pattern corresponding to the signal location D" is "+1". Subtraction is performed on the two, to obtain the "DFE check value corresponding to the signal location D", namely, "−1".

S142: The location detection apparatus compares the DFE check value corresponding to the signal location D with the preset range, to obtain a first comparison result.

The preset range is determined based on the sign value obtained through DFE decision. For example, Table 1 is used as an example. The sign value obtained through DFE decision includes at least one value of "0", "1", "2", and "3". Therefore, the preset range is.

The first comparison result indicates a signal location, whose DFE check value exceeds the preset range, in the signal location D.

For example, "the signal location D is implemented as the decision signal identity 16" is used as an example. The SoBD module of the location detection apparatus compares a "DFE check value corresponding to the decision signal identity 16" with the preset range, to obtain the first comparison result. For example, the second comparison result indicates that the "DFE check value corresponding to the decision signal identity 16" does not exceed the preset range.

S143: The location detection apparatus determines a signal location C based on the first comparison result.

The signal location C is a signal location in the signal location D.

For example, if the second comparison result indicates a "DFE check value corresponding to a signal location in the signal location D exceeds the preset range", the error location detection module of the location detection apparatus determines that a signal location (namely, a signal location at which the DFE check value exceeds the preset range) indicated by the first comparison result is the signal location C. Otherwise, if the first comparison result indicates "the DFE check value corresponding to the signal location D does not exceed the preset range", the error location detection module of the location detection apparatus determines that the signal location D does not include the signal location C. Herein, Table 1 is still used as an example. The error location detection module determines that the "DFE check value corresponding to the decision signal identity 16" does not exceed the preset range. In this case, the signal location corresponding to the "decision signal identity 16" is not the signal location C. The SoBD module further determines whether the signal location corresponding to the "decision signal identity 15" is the signal location C. If the signal location corresponding to the "decision signal identity 15" is not the signal location C, the error location detection module continues to determine a status of the "decision signal identity 14" until the error location detection module determines that a "DFE check value (namely, −1) corresponding to the decision signal identity 4" exceeds the preset range. In this case, a signal location corresponding to the "decision signal identity 4" is the signal location C.

Therefore, when the location detection apparatus determines DFE check values corresponding to signal locations, the location detection apparatus can determine, based on value statuses of the DFE check values, which signal location is an earliest signal location at which the decision signal of the SoB may appear in the decision signal sequence, namely, the signal location C.

It should be noted that, if the location detection apparatus does not obtain the location of the decision signal of the EoB in the decision signal sequence, it indicates that there is no burst error in the decision signal sequence, and the location detection apparatus outputs the original decision signal sequence.

It may be understood that, in the location detection method provided in embodiments, when the location detection apparatus determines the location of the decision signal of the EoB in the decision signal sequence, the location detection apparatus can further obtain a target value at a signal location B before the decision signal of the EoB, for example, at least one of a sign value of the decision signal at the signal location B, an equalization value corresponding to the signal location B, and a first difference corresponding to the signal location B, to determine the location of the decision signal of the SoB in the decision signal sequence based on the target value. This provides a basis for eliminating an error at the SoB, and helps reduce a bit error rate.

Further, the location detection apparatus is further configured to perform correction based on a decision signal corresponding to an error location in the decision signal sequence.

Figure 15:
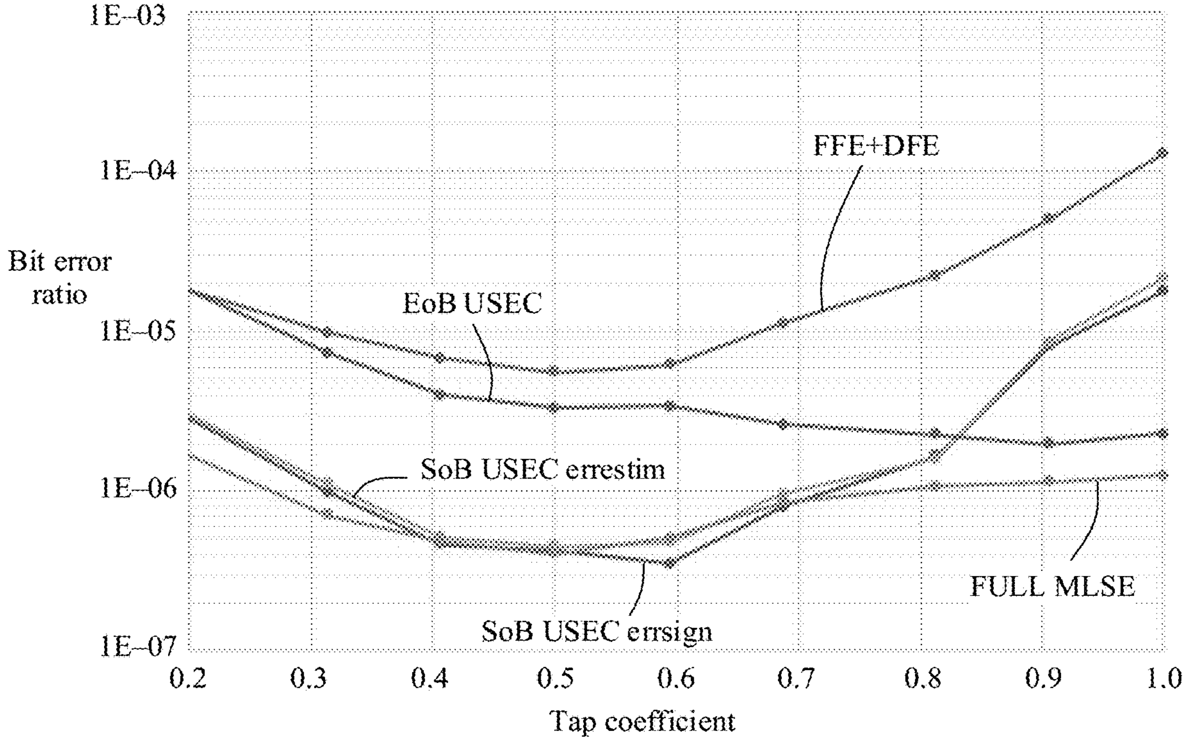
FIG. 15 is a diagram of performance comparison according to an embodiment.

FIG. 15 is a diagram of performance comparison in a case in which the tap coefficient is less than or equal to the first preset threshold. In FIG. 15, a horizontal axis indicates a of the DFE, namely, Es/No. A vertical axis indicates a BER, and the bit error rate may also be referred to as a bit error ratio.

A curve FFE+DFE is an equalization performance curve of the DFE based on the channel (1+D) under a condition that precoding is disabled. A curve FULL MLSE is a performance curve of MLSE based on the channel (1+D) under a condition that precoding is enabled. A curve SoB_USEC errsign is an equalization performance curve in a method mode 1 based on the channel (1+D). A curve EoB_USEC is an equalization performance curve in a method mode 2 based on the channel (1+D).

It is clear that, when the tap coefficient is less than about 0.825, performance in the method mode 1 is better than equalization performance in the method mode 2, or when the tap coefficient is greater than about 0.825, performance in the method mode 2 is better than equalization performance in the method mode 1. Equalization performance in the method mode 1 and the method mode 2 under different tap coefficients is similar to that of the MLSE, but power consumption and calculation complexity are both less than those of the MLSE.

Figure 16:
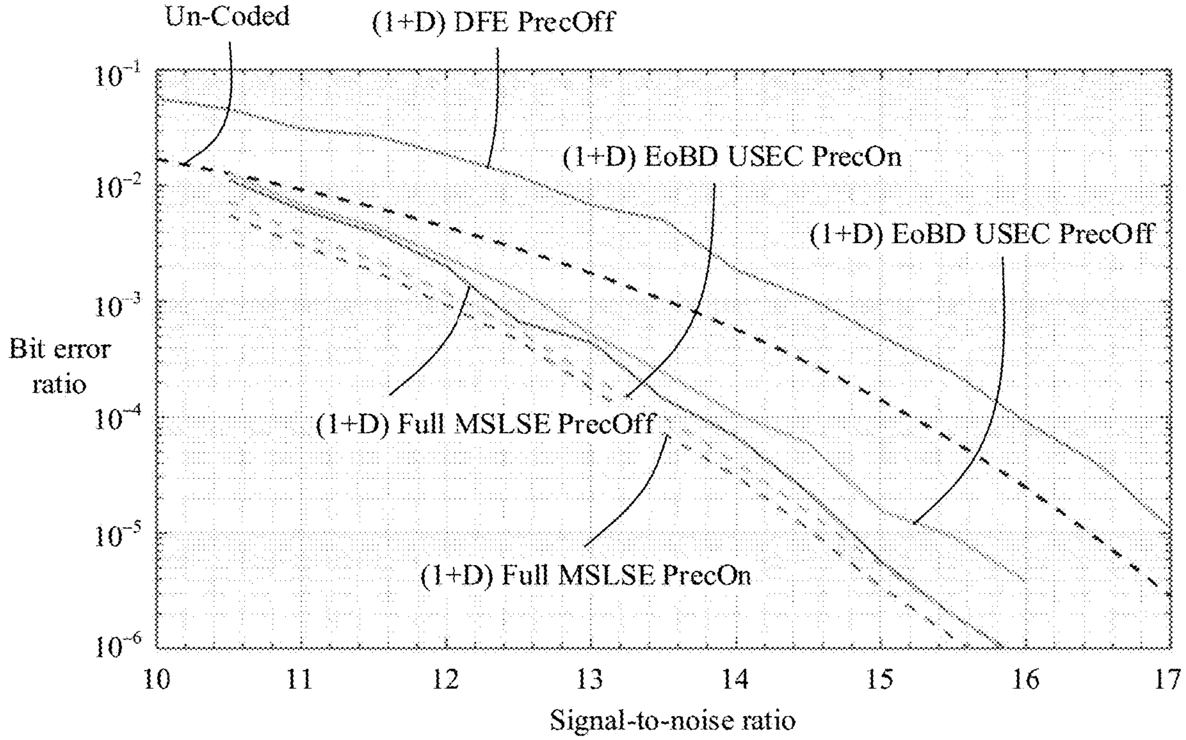
FIG. 16 is another diagram of performance comparison according to an embodiment.

FIG. 16 is a diagram of performance comparison in a case in which the tap coefficient is greater than the first preset threshold. In FIG. 16, a horizontal axis indicates a signal-to-noise ratio, and the signal-to-noise ratio is represented by dividing energy carried in each sign by noise power spectrum density, namely, Es/No. A vertical axis indicates a BER, and the BER may also be referred to as a bit error ratio.

In FIG. 16, a curve Un-Coded is an equalization performance curve of the DFE based on the channel (1+D) under a condition that precoding is disabled in the technology. A curve (1+D) DFE PrecOff is a performance curve of the DFE based on the channel (1+D) under the condition that precoding is disabled in the technology. A curve (1+D) DFE PrecOn is a performance curve of the DFE based on the channel (1+D) under a condition that precoding is enabled in the technology. A curve (1+D) EOBD USEC PrecOff is a performance curve of the error location detection module based on the channel (1+D) under the condition that precoding is disabled. A curve (1+D) EOBD USEC PrecOn is a performance curve of the error location detection module based on the channel (1+D) under the condition that precoding is enabled. A curve (1+D) Full MSLSE PrecOff is a performance curve of the error location detection module based on the channel (1+D) under a condition that MSLSE is disabled. A curve (1+D) Full MSLSE PrecOn is a performance curve of the error location detection module based on the channel (1+D) under the condition that precoding is enabled.

It is clear that the error location detection module is enabled, so that performance of error detection is equivalent to that in a case of enabling the MLSE, but power consumption and calculation complexity of the method are far less than those of the MLSE.

It may be understood that the foregoing mainly describes the solutions provided in embodiments from a perspective of the method. Correspondingly, embodiments further provide a location detection apparatus. The location detection apparatus may be the apparatus in the foregoing method embodiment, or may be a component that can be used in the foregoing apparatus. It may be understood that, to implement the foregoing functions, the location detection apparatus includes a corresponding hardware structure and/or software module for performing each function. A person skilled in the art should be easily aware that, in combination with units and algorithm steps of the examples described in embodiments, this disclosure may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

Figure 17:
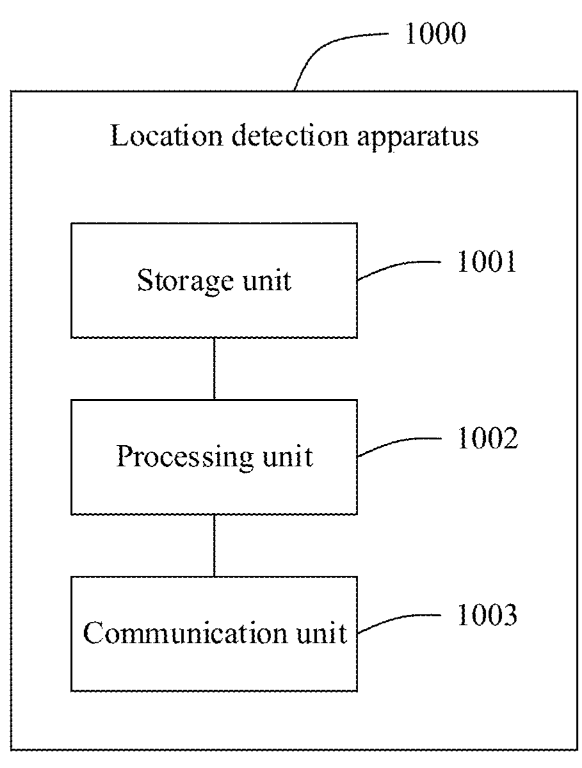
FIG. 17 is a schematic diagram of a structure of a location detection apparatus according to an embodiment.

In a possible embodiment, FIG. 17 is a schematic diagram of a structure of a location detection apparatus 1000. The location detection apparatus 1000 includes a communication unit 1003 and a processing unit 1002.

For example, the location detection apparatus 1000 is the location detection apparatus in FIG. 6 in the foregoing method embodiment. The communication unit 1003 is configured to perform S801 to S807 of the location detection apparatus, and/or the communication unit 1003 is further configured to perform other receiving and sending steps of the location detection apparatus in embodiments. The processing unit 1002 is configured to perform S801 to S807 of the location detection apparatus in embodiments, and/or the processing unit 1002 is configured to perform other processing steps of the location detection apparatus in embodiments.

All related content of the steps in the foregoing method embodiment may be cited in function descriptions of the corresponding functional modules. Details are not described herein again.

It should be understood that the processing unit 1002 may be implemented by a processor or a processor-related circuit component, and the communication unit 1003 may be implemented by a transceiver or a transceiver-related circuit component.

Optionally, the location detection apparatus 1000 may further include a storage unit 1001 configured to store program code and data of the location detection apparatus 1000. The data may include but is not limited to raw data, intermediate data, or the like.

The processing unit 1002 may be a processor or a controller, for example, a central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processing unit may implement or execute various example logical blocks, modules, and circuits described with reference to the disclosed content. Alternatively, the processor may be a combination of processors implementing a computing function, for example, a combination of one or more microprocessors, or a combination of the DSP and a microprocessor.

The communication unit 1003 may be a communication interface, a transceiver, a transceiver circuit, or the like. The communication interface is a general name, and may include a plurality of interfaces during specific implementation.

The storage unit 1001 may be a memory.

When the processing unit 1002 is a processor, the communication unit 1003 is a communication interface, and the storage unit 1001 is a memory, a location detection apparatus 1100 may be shown in FIG. 17.

Figure 18:
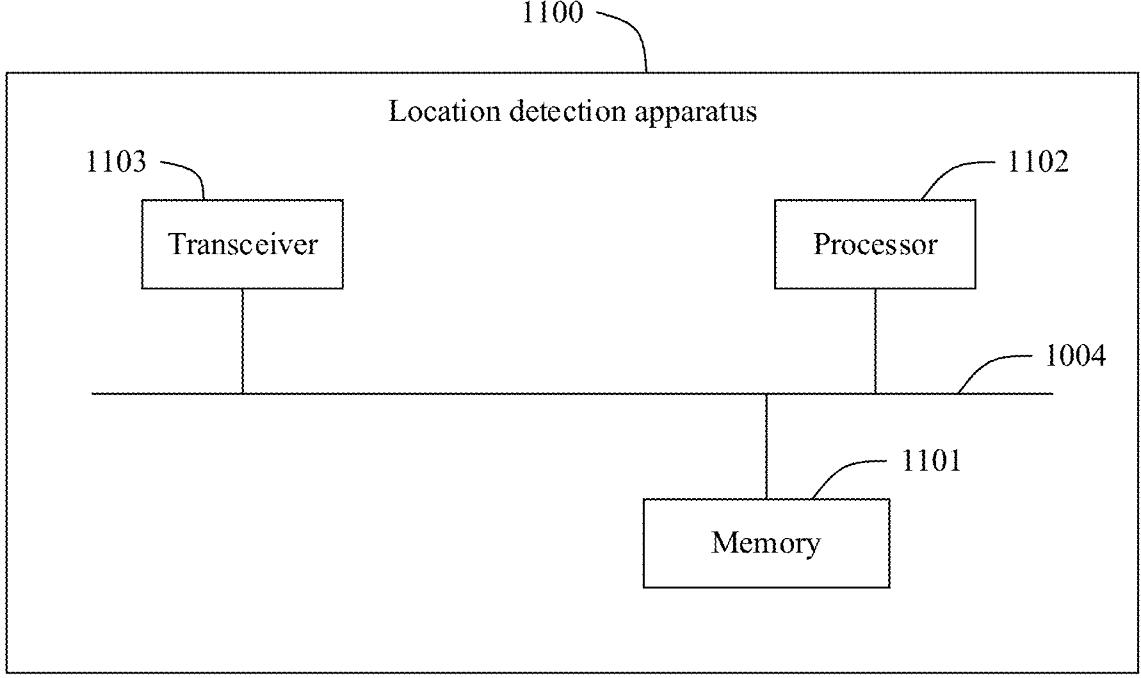
FIG. 18 is a schematic diagram of a structure of another location detection apparatus according to an embodiment.

For another example, refer to FIG. 18. In another possible embodiment, the location detection apparatus 1100 includes a processor 1102, a transceiver 1103, and a memory 1101.

The transceiver 1103 may be an independently disposed transmitter, and the transmitter may be configured to send information to another device. Alternatively, the transceiver may be an independently disposed receiver, and is configured to receive information from another device. Alternatively, the transceiver may be a component that integrates functions of sending and receiving information.

Optionally, the location detection apparatus 1100 may further include a bus 1104. The transceiver 1103, the processor 1102, and the memory 1101 may be connected to each other through the bus 1104. The bus 1104 may be a Peripheral Component Interconnect (PCI) bus, an Extended Industry Standard Architecture (EISA) bus, or the like. The bus 1104 may be classified into an address bus, a data bus, a control bus, or the like. For ease of representation, only one thick line is used to represent the bus in FIG. 11, but this does not mean that there is only one bus or only one type of bus.

In another possible embodiment, a chip includes a logic circuit and an input/output interface. The input/output interface is configured to communicate with a module other than the chip, and the logic circuit is configured to perform an operation on the location detection apparatus in the foregoing method embodiment other than the sending and receiving operations.

For example, the chip implements a function of the location detection apparatus in FIG. 8 in the foregoing method embodiment, the input/output interface is configured to perform S801 to S807 of the location detection apparatus, and/or the input/output interface is further configured to perform other receiving and sending steps of the location detection apparatus in embodiments. The logic circuit is configured to perform S801 to S807 of the location detection apparatus, and/or the logic circuit is further configured to perform another processing step.

A person of ordinary skill in the art may understand that all or a part of the foregoing embodiments may be implemented by software, hardware, firmware, or any combination thereof. When the software is used for implementation, all or a part of the technical solutions may be implemented in a form of a computer program product. The computer program product includes one or more computer instructions. When the computer program instructions are loaded and executed on the computer, the procedure or functions according to embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, a solid-state drive (SSD)), or the like.

In the several embodiments provided, it should be understood that the disclosed system, apparatus, and method may be implemented in another manner. For example, the described apparatus embodiments are merely examples. For example, division into the units is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located at one location, or may be distributed on a plurality of network devices. A part or all of the units may be selected based on an actual requirement to achieve the objectives of the solutions of embodiments.

In addition, functional units in embodiments may be integrated into one processing unit, or each of the functional units may exist independently, or two or more units may be integrated into one unit. The integrated unit may be implemented in a form of hardware, or may be implemented in a form of hardware plus a software functional unit.

Based on the foregoing descriptions of the implementations, a person skilled in the art may clearly understand that this disclosure may be implemented by software in addition to universal hardware or by hardware only. In most circumstances, the former is an example implementation. Based on such an understanding, the technical solutions may be implemented in a form of a software product. The computer software product is stored in a readable storage medium, such as a floppy disk, a hard disk drive or an optical disc of a computer, and includes several instructions for instructing a computer device (which may be a personal computer, a server, or a network device) to perform the methods described in embodiments.

The foregoing descriptions are merely specific implementations, but are not intended to limit the protection scope of this disclosure. Any variation or replacement within the technical scope disclosed shall fall within the protection scope of this disclosure. Therefore, the protection scope of this disclosure shall be subject to the protection scope of the claims.

What is claimed is:

1. A location detection method comprising:

obtaining a decision feedback equalizer coefficient comprising a tap coefficient;

obtaining a decision signal sequence of a decision feedback equalizer;

determining a first location of a first decision signal of a start-of-burst error in the decision signal sequence when the tap coefficient is less than or equal to a preset threshold; and determining a second location of a second decision signal of an end-of-burst error in the decision signal sequence based on the first location.

2. The location detection method of claim 1, wherein determining the second location comprises:

determining a first candidate location after the first decision signal and at which the second decision signal appears latest in the decision signal sequence;

determining a first decision region based on the first candidate location and the first location, wherein the first decision region comprises the first candidate location and a third location corresponding to a third decision signal between the first location and the first candidate location; and determining the second location based on the first decision region.

3. The location detection method of claim 2, wherein determining the second location further comprises:

obtaining a first difference corresponding to a fourth decision signal in the first decision region, wherein the first difference is between a sign value of the fourth decision signal and a corresponding equalization value; and determining, as the second location, a fourth location in the first decision region at which a first positive sign or a first negative sign of a second difference corresponding to a fifth decision signal from the first location to the first candidate location is, for a first time, the same as a second positive sign or a second negative sign of a third difference corresponding to a previously adjacent decision signal.

4. The location detection method of claim 2, wherein determining the second location further comprises:

obtaining an error pattern corresponding to a fourth decision signal in the first decision region;

determining an estimated error pattern based on a first difference and the error pattern, wherein the first difference is between a sign value of the fourth decision signal and a corresponding equalization value, and wherein the estimated error pattern is a second difference between the first difference and the error pattern; and determining a fourth location of a fifth decision signal with a maximum absolute value of the estimated error pattern as the second location.

5. The location detection method of claim 2, wherein determining the first candidate location comprises:

obtaining a decision feedback equalizer (DFE) check value corresponding to a fourth decision signal in the decision signal sequence, wherein the DFE check value is based on a sign value of the fourth decision signal and a corresponding estimated error pattern; and determining a fourth location at which the DFE check value exceeds a preset range as the first candidate location.

6. The location detection method of claim 2, further comprising:

determining a fourth location of the second decision signal when the tap coefficient is greater than the preset threshold;

determining a second candidate location before the second decision signal and at which the first decision signal starts to appear in the decision signal sequence; and determining a fifth location of the first decision signal based on the second candidate location and the third location.

7. The location detection method of claim 6, wherein determining the fifth location comprises:

determining a second decision region based on the fourth location and the second candidate location, wherein the second decision region comprises the second candidate location and a sixth location corresponding to a fourth decision signal between the second candidate location and the fourth location;

obtaining a difference corresponding to a fifth decision signal in the second decision region, wherein the difference is between a sign value of the fifth decision signal and a corresponding equalization value; and determining a seventh location of a sixth decision signal corresponding to a maximum absolute value of the difference as the fourth location.

8. The location detection method of claim 1, further comprising correcting a decision signal corresponding to the first location to the second location.

9. A location detection apparatus comprising:

a non-transitory memory configured to store instructions; and one or more processors coupled to the non-transitory memory and configured to execute the instructions to cause the location detection apparatus to:

obtain a decision feedback equalizer coefficient comprising a tap coefficient;

obtain a decision signal sequence of a decision feedback equalizer;

determine a first location of a first decision signal of a start-of-burst error in the decision signal sequence when the tap coefficient is less than or equal to a preset threshold; and determine a second location of a second decision signal of an end-of-burst error in the decision signal sequence based on the first location.

10. The location detection apparatus of claim 9, wherein the one or more processors are further configured to execute the instructions to cause the location detection apparatus to determine the second location by:

determining a first candidate location after the first decision signal and at which the second decision signal appears latest in the decision signal sequence;

determining a first decision region based on the first candidate location and the first location, wherein the first decision region comprises the first candidate location and a third location corresponding to a third decision signal between the first location and the first candidate location; and determining the second location based on the first decision region.

11. The location detection apparatus of claim 10, wherein the one or more processors are further configured to execute the instructions to cause the location detection apparatus to further determine the second location by:

obtaining a first difference corresponding to a fourth decision signal in the first decision region, wherein the first difference is between a sign value of the fourth decision signal and a corresponding equalization value; and determining, as the second location, a fourth location in the first decision region at which a first positive sign or a first negative sign of a second difference corresponding to a fifth decision signal from the first location to the first candidate location is, for a first time, the same as a second positive sign or a second negative sign of a third difference corresponding to a previously adjacent decision signal.

12. The location detection apparatus of claim 10, wherein the one or more processors are further configured to execute the instructions to cause the location detection apparatus to further determine the second location by:

obtaining an error pattern corresponding to a fourth decision signal in the first decision region;

determining an estimated error pattern based on a first difference and the error pattern, wherein the first difference is between a sign value of the fourth decision signal and a corresponding equalization value, and wherein the estimated error pattern is a second difference between the first difference and the error pattern; and determining a fourth location of a fifth decision signal with a maximum absolute value of the estimated error pattern as the second location.

13. The location detection apparatus of claim 10, wherein the one or more processors are further configured to execute the instructions to cause the location detection apparatus to determine the first candidate location by:

obtaining a decision feedback equalizer (DFE) check value corresponding to a fourth decision signal in the decision signal sequence, wherein the DFE check value is based on a sign value of the fourth decision signal and a corresponding estimated error pattern; and determining a fourth location at which the DFE check value exceeds a preset range as the first candidate location.

14. The location detection apparatus of claim 10, wherein the one or more processors are further configured to execute the instructions to cause the location detection apparatus to:

determine a fourth location of the second decision signal when the tap coefficient is greater than the preset threshold;

determine a second candidate location before the second decision signal and at which the first decision signal starts to appear in the decision signal sequence; and determine a fifth location of the first decision signal based on the second candidate location and the third location.

15. The location detection apparatus of claim 14, wherein the one or more processors are further configured to execute the instructions to cause the location detection apparatus to:

determine a second decision region based on the fourth location and the second candidate location, wherein the second decision region comprises the second candidate location and a sixth location corresponding to a fourth decision signal between the second candidate location and the fourth location;

obtain a difference corresponding to a fifth decision signal in the second decision region, wherein the difference is between a sign value of the fifth decision signal and a corresponding equalization value; and determine a seventh location of a sixth decision signal corresponding to a maximum absolute value of the difference.

16. The location detection apparatus of claim 9, wherein the one or more processors are further configured to execute the instructions to cause the location detection apparatus to correct a decision signal corresponding to the first location to the second location.

17. A non-transitory computer-readable storage medium storing a program, that when executed by one or more processors, causes a location detection apparatus to:

obtain a decision feedback equalizer coefficient comprising a tap coefficient;

obtain a decision signal sequence of a decision feedback equalizer;

determine a first location of a first decision signal of a start-of-burst error in the decision signal sequence when the tap coefficient is less than or equal to a preset threshold; and determine a second location of a second decision signal of an end-of-burst error in the decision signal sequence based on the first location.

18. The non-transitory computer-readable storage medium of claim 17, wherein the program, when executed by the one or more processors, further causes the location detection apparatus to:

determine a first candidate location after the first decision signal and at which the second decision signal appears latest in the decision signal sequence;

determine a first decision region based on the first candidate location and the first location, wherein the first decision region comprises the first candidate location and a third location corresponding to a third decision signal between the first location and the first candidate location; and determine the second location based on the first decision region.

19. The non-transitory computer-readable storage medium of claim 18, wherein the program, when executed by the one or more processors, further causes the location detection apparatus to determine the second location by:

obtaining a first difference corresponding to a fourth decision signal in the first decision region, wherein the first difference is between a sign value of the fourth decision signal and a corresponding equalization value; and determining, as the second location, a fourth location in the first decision region at which a first positive sign or a first negative sign of a second difference corresponding to a fifth decision signal from the first location to the first candidate location is, for a first time, the same as a second positive sign or a second negative sign of a third difference corresponding to a previously adjacent decision signal.

20. The non-transitory computer-readable storage medium of claim 18, wherein the program, when executed by the one or more processors, further causes the location detection apparatus to determine the second location by:

obtaining an error pattern corresponding to a fourth decision signal in the first decision region;

determining an estimated error pattern based on a first difference and the error pattern, wherein the first difference is between a sign value of the fourth decision signal and a corresponding equalization value, and wherein the estimated error pattern is a second difference between the first difference and the error pattern; and determining a fourth location of a fifth decision signal with a maximum absolute value of the estimated error pattern as the second location.

* * * * *